US012598013B2

(12) United States Patent
Bonde et al.

(10) Patent No.: US 12,598,013 B2
(45) Date of Patent: Apr. 7, 2026

(54) ROBUST BROADCAST VIA RELAYED RETRANSMISSION

(71) Applicant: Bose Corporation, Framingham, MA (US)

(72) Inventors: Casper Stork Bonde, Støvring (DK); Rasmus Abildgren, Skørping (DK); Nathan A. Blagrove, Wayland, MA (US); Douglas Warren Young, Arlington, MA (US)

(73) Assignee: Bose Corporation, Framingham, MA (US)

( * ) Notice: Subject to any disclaimer, the term of this patent is extended or adjusted under 35 U.S.C. 154(b) by 323 days.

(21) Appl. No.: 18/218,079

(22) Filed: Jul. 4, 2023

(65) Prior Publication Data

US 2023/0344535 A1 Oct. 26, 2023

Related U.S. Application Data

(63) Continuation of application No. 17/132,362, filed on Dec. 23, 2020, now Pat. No. 11,695,487.

(51) Int. Cl.

| | |
|---|---|
| ***H04L 1/1829*** | (2023.01) |
| ***H04H 20/08*** | (2008.01) |
| ***H04H 20/89*** | (2008.01) |
| ***H04L 1/00*** | (2006.01) |

(52) U.S. Cl.
CPC ............ *H04H 20/08* (2013.01); *H04H 20/89* (2013.01)

(58) Field of Classification Search
None
See application file for complete search history.

(56) References Cited

U.S. PATENT DOCUMENTS

| | | | | |
|---|---|---|---|---|
| 11,445,561 | B2 * | 9/2022 | Lei | H04B 7/0695 |
| 2021/0288764 | A1 * | 9/2021 | Linsky | H04L 65/611 |
| 2021/0306103 | A1 * | 9/2021 | Young | H04L 1/1887 |
| 2022/0038769 | A1 * | 2/2022 | Meiyappan | H04N 21/4398 |
| 2022/0103607 | A1 * | 3/2022 | Young | G06F 3/167 |

FOREIGN PATENT DOCUMENTS

| | | | | |
|---|---|---|---|---|
| CN | 111935815 A | * | 11/2020 | H04W 4/80 |
| CN | 113966624 A | * | 1/2022 | H04W 56/001 |
| WO | WO-2016003064 A1 | * | 1/2016 | H04W 4/80 |
| WO | WO-2022056682 A1 | * | 3/2022 | H04W 4/80 |

* cited by examiner

*Primary Examiner* — Mohammed Rachedine
(74) *Attorney, Agent, or Firm* — Bond, Schoeneck & King, PLLC

(57) ABSTRACT

Systems and methods for broadcasting wireless data via one or more retransmission schemes to increase the packet reception in a wireless system. One or more devices of the system are configured to listen for an initial data packet from a source device. Should one or more devices successfully receive the initial packet, each device that received the packet can unconditionally retransmit a copy of the payload of the initial packet such that any device that failed to receive the initial packet payload has an opportunity to receive it during the respective retransmissions. Similarly, each device of the system can send acknowledgements to the other system devices that indicate whether they received the initial packet. Should one or more of the devices successfully receive the initial packet, the devices can conditionally retransmit a copy of the missing payload when one or more devices indicates they have failed to receive it.

18 Claims, 16 Drawing Sheets

ROBUST BROADCAST VIA RELAYED RETRANSMISSION

RELATED APPLICATIONS

This application is a continuation application of U.S. patent application Ser. No. 17/132,362, filed on Dec. 23, 2020, hereby incorporated by reference in its entirety.

BACKGROUND

Aspects and implementations of the present disclosure are generally directed to systems and methods for broadcasting and receiving wireless data streams, e.g., broadcasting and receiving wireless data streams between wireless devices.

Speaker systems, for example, wireless multi-speaker systems typically attempt to receive each successive wireless packet at each device of the system simultaneously. For example, a central device may send wireless data intended for all peripheral devices. Each peripheral device is responsible for receiving each packet of data and potentially rendering the data into acoustic energy. However, the quality of these systems suffers when one or more of the peripheral devices begins to start to miss or drop packets of data. For example, one peripheral device may be positioned far away from the central device or may experience interference leading to a significant amount of dropped packets. With enough dropped packets, the effected peripheral device may significantly hinder the function of the system, and/or significantly effect the user's enjoyment of the system.

SUMMARY OF THE DISCLOSURE

The present disclosure provides more robust systems and methods for broadcasting wireless data that utilize one or more retransmission schemes to increase the packet reception within a given wireless system. In some examples, one or more devices of the system are configured to listen for an initial data packet from a source device. Should one or more devices successfully receive the initial data packet, each device that received the packet can unconditionally retransmit, via their own respective broadcast stream, a retransmitted copy of the payload of the initial packet such that any device that failed to receive the initial packet payload has an opportunity to receive it during the respective retransmissions. Similarly, each device of the system can send acknowledgements to the other devices of the system that indicate whether they received the initial packet. Should one or more of the devices successfully receive the initial data packet, the devices can conditionally retransmit, via their own respective broadcast stream, a retransmitted copy of the payload of the initial data packet only when one or more devices indicates they have failed to receive it.

In some examples, the retransmission windows of each device can be shifted in time with respect to each other, e.g., using a predefined time offset such that a device that is listening for a retransmitted packet has multiple sequential opportunities to receive the retransmitted packet. Other examples or modifications to the unconditional and condition retransmission schemes discussed herein include the ability to send multiple differentiated packets within the same retransmission window, and/or the ability to sacrifice a given device's ability to receive the next successive payload from the source device in favor of receiving a retransmitted copy of the initial payload. Furthermore, in some examples, the devices of the system may utilize a block acknowledgement and retransmission plan sharing scheme that allows the devices of the system to share with each other a record of the packets they have received or failed to receive in the past, as well as their plans for retransmission in the future. The sharing of these acknowledgment and retransmission plans can be logically and temporally optimized to increase the efficiency of sharing between large groups of devices. In further examples, the systems described herein can be utilized with Dolby Surround Sound systems and/or wireless wearable audio device such as truly wireless headphones. In the examples that utilize the truly wireless headphones, the system may broadcast packets related to left and right stereo signals intended for the left and right headphones, respectively, and the charging case that is configured to matingly engage with (and in some examples charge) the headphones, can be used as a retransmission device, e.g., a device that also listens for, receives, and retransmits the left and right signals to the headphones. As will be described below, in some examples, the system is configured to adaptively switch between retransmission schemes, e.g., fallback from a conditional retransmission scheme to an unconditional retransmission scheme should a significant number of devices fail to receive packets.

In the example systems and methods discussed herein, one or more device can utilize wireless data transmission, specifically, wireless topologies for broadcasting and transmitting audio streams between devices. For example, Core Specification 5.2 ("The Core Specification") released by the Bluetooth Special Interest Group (SIG) on Dec. 31, 2019, defines new features related to Bluetooth Low Energy (BLE) topologies. One feature described in the 5.2 Core Specification is Broadcast Isochronous Streams which utilize connectionless isochronous communications. A similar feature described by the 5.2 Core Specification is an LE Connected Isochronous Stream, which utilizes connection-oriented isochronous channels to provide a point-to-point isochronous communication stream between two devices, e.g., between source device 102 and devices 104 (discussed below). In one example, the systems, devices, and methods discussed herein utilize Bluetooth Low-Energy audio topologies enabled by the 5.2 Core Specification (referred to herein as "LE Audio"). For example, LE Audio enables unicast wireless topologies (referred to as "connected isochronous streams") that allow a single Bluetooth audio source device (e.g., a smart phone) to transmit multiple audio streams to separate Bluetooth devices at the same time, e.g., wireless headphones. These topologies are intended to improve Bluetooth operation for wireless headphones.

In one example, a method of retransmitting a payload of a data packet is provided, the method including: receiving, at a first device, the payload of a data packet from a source device via a broadcast isochronous stream; and transmitting the payload from the first device to a second device.

In one aspect, the transmitting of the payload from the first device to the second device is performed via another broadcast isochronous stream.

In one aspect, the transmitting of the payload from the first device to the second device uses a different frequency or channel relative to a frequency or channel used for receiving the payload from the source device.

In one aspect, the payload of the data packet is received at the first device within a first sub-event of a Broadcast Isochronous Stream (BIS) interval of the broadcast isochronous stream and the transmission of the payload from the first device to the second device is performed during a time interval coincident with, overlapping with, or after a second sub-event of the BIS interval of the broadcast isochronous stream where the second sub-event is after the first sub-event.

In one aspect, the second device includes a radio configured to listen for the data packet over a first transmission frequency related to the source device during the second sub-event of the first BIS interval of the broadcast isochronous stream, and, if the second device fails to receive at least a preamble of the data packet over the first transmission frequency, the method further including: listening for another data packet over a second transmission frequency different than the first transmission frequency, the other data packet related to the payload received by the first device.

In one aspect, the data packet is sent within a first sub-event of a Broadcast Isochronous Stream (BIS) interval of the broadcast isochronous stream and the transmission of the payload from the first device to the second device is performed during a time interval that has been temporally shifted with respect to a second sub-event of the BIS interval of the broadcast isochronous stream where the second sub-event is after the first sub-event.

In one aspect, the first device and the second device are configured to acknowledge receipt of the payload such that the transmission of the payload from the first device to the second device occurs only when the first device has acknowledged receipt of the data packet and the second device has not acknowledged receipt of the data packet.

In one aspect, the data packet is sent within a first Broadcast Isochronous Stream (BIS) interval of the broadcast isochronous stream and the transmission of the payload from the first device to the second device occurs during a second BIS interval of the broadcast isochronous stream after the first BIS interval.

In one aspect, the payload includes audio data relating to multiple channels of a multichannel audio signal.

In one aspect, the payload includes audio data relating to a left channel or a right channel of a stereo audio signal.

In one aspect, the method further includes: prior to the transmission of the payload from the first device to the second device, receiving, at the first device, an indication that the second device did not successfully receive the payload.

In another example, a method of receiving a retransmitted data packet from a first device is provided, the method including: listening for, at a second device, a data packet from a source device via a broadcast isochronous stream, the data packet having a payload; and listening for, at the second device, another data packet from the first device after not receiving the data packet from the source device, the other data packet including the payload.

In one aspect, the other data packet is received by the second device via another broadcast isochronous stream.

In one aspect, the other broadcast isochronous stream uses a different frequency or channel relative to a frequency or channel use for receiving the payload from the source device.

In one aspect, the second device listens for the data packet from the source device during a first sub-event of a Broadcast Isochronous Stream (BIS) interval of the broadcast isochronous stream and the transmission of the payload of the other data packet from the first device to the second device is performed during a time interval coincident with, overlapping with, or after a second sub-event of the BIS interval of the broadcast isochronous stream where the second sub-event is after the first sub-event.

In one aspect, the second device comprises a radio configured to listen for the data packet over a first transmission frequency related to the source device during the second sub-event of the first BIS interval of the broadcast isochronous stream, and, if the second device fails to receive at least a preamble of the data packet over the first transmission frequency, the method further includes: listening for the other data packet over a second transmission frequency different than the first transmission frequency, the other data packet related to the payload received by the first device.

In one aspect, the data packet is sent within a first sub-event of a Broadcast Isochronous Stream (BIS) interval of the broadcast isochronous stream and the transmission of the payload from the first device to the second device is performed during a time interval that has been temporally shifted with respect to a second sub-event of the BIS interval of the broadcast isochronous stream where the second sub-event is after the first sub-event.

In one aspect, the first device and the second device are configured to acknowledgement receipt of the payload such that the transmission of the payload from the first device to the second device occurs only when the first device has acknowledged receipt of the data packet and the second device has not acknowledged receipt of the data packet.

In one aspect, the data packet is sent within a first Broadcast Isochronous Stream (BIS) interval of the broadcast isochronous stream and the transmission of the payload from the first device to the second device occurs during a second BIS interval of the broadcast isochronous stream after the first BIS interval.

In one aspect, the payload includes audio data relating to multiple channels of a multichannel audio signal.

In one aspect, the payload includes audio data relating to a left channel or a right channel of a stereo audio signal.

In one aspect, the method further includes: prior to the transmission of the payload from the first device to the second device, receiving, at the first device, an indication that the second device did not successfully receive the payload.

In one aspect, the second device includes a processor and a non-transitory computer-readable memory configured to execute and store, respectively, a set of non-transitory computer-readable instructions that when executed by the processor are configured to: execute at least one algorithm that tracks a success rate of successful packet receipt by the first device and the second device; and establish a predetermined retransmission relationship between the first and second devices based on the success rate of the first device and second device.

In one aspect, the second device is configured to transmit a block acknowledgement on behalf of the first device and the second device, the block acknowledgement including data relating to whether the first device and the second device have successfully received the payload.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure provides more robust systems and methods for broadcasting wireless data that utilize one or more retransmission schemes to increase the packet reception within a given wireless system. In some examples, one or more devices of the system are configured to listen for an initial data packet from a source device. Should one or more devices successfully receive the initial data packet, each device that received the packet can unconditionally retransmit, via their own respective broadcast stream, a retransmitted copy of the payload of the initial packet such that any device that failed to receive the initial packet payload has an opportunity to receive it during the respective retransmissions. Similarly, each device of the system can send acknowledgements to the other devices of the system that indicate whether they received the initial packet. Should one or more of the devices successfully receive the initial data packet, the devices can conditionally retransmit, via their own respective broadcast stream, a retransmitted copy of the payload of the initial data packet only when one or more devices indicates they have failed to receive it.

Figure 1:
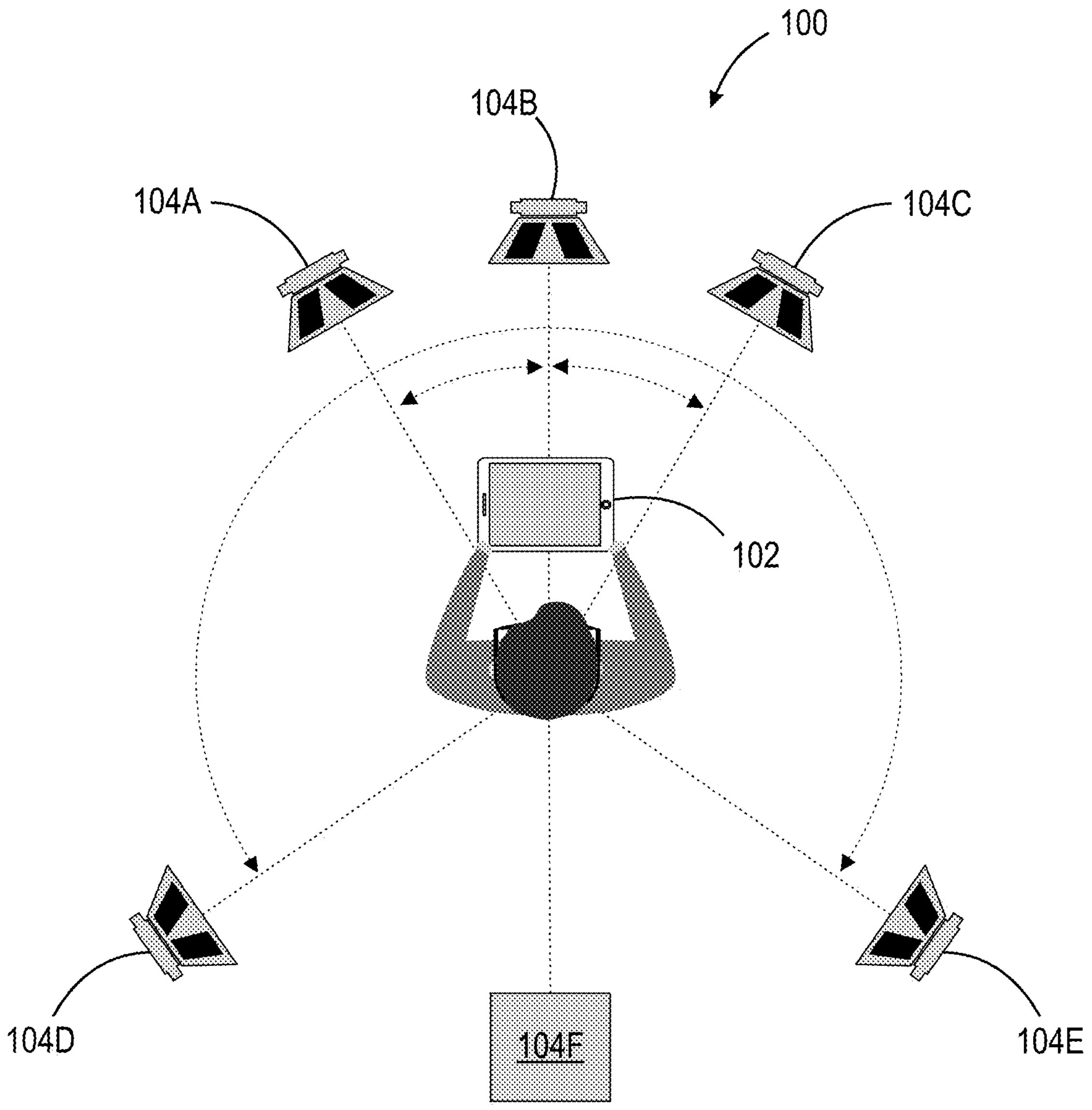
FIG. 1 is a schematic view of a system according to the present disclosure.

The term "wearable audio device", as used in this application, in addition to including its ordinary meaning or its meaning known to those skilled in the art, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver can be housed in an earcup. While some of the figures and descriptions following can show a single wearable audio device, having a pair of earcups (each including an acoustic driver) it should be appreciated that a wearable audio device can be a single stand-alone unit having only one earcup. Each earcup of the wearable audio device can be connected mechanically to another earcup or headphone, for example by a headband and/or by leads that conduct audio signals to an acoustic driver in the ear cup or headphone. A wearable audio device can include components for wirelessly receiving audio signals. A wearable audio device can include components of an active noise reduction (ANR) system. Wearable audio devices can also include other functionality such as a microphone so that they can function as a headset. While FIG. 1 shows an example of an in-the-ear headphone form factor, in other examples the wearable audio device can be an on-ear, around-ear, behind-ear, over-the-ear or near-ear headset, or can be an audio eyeglasses form factor headset. In some examples, the wearable audio device can be an open-ear device that includes an acoustic driver to radiate acoustic energy towards the ear while leaving the ear open to its environment and surroundings.

The term "connected isochronous stream" as used herein, in addition to including its ordinary meaning or its meaning known to those skilled in the art, is intended to refer to an isochronous data stream which utilizes a preestablished, point-to-point communication link over LE Audio between, e.g., a source device (which may also be known as a central or master device) and an audio device or a plurality of audio devices (which may also be known as a peripheral or slave device(s)). In other words, a connected isochronous stream can provide an isochronous audio stream which utilizes at least one established reliable communication channel and/or at least one acknowledged communication channel between the source device and any respective audio devices.

The term "broadcast isochronous stream" as used herein, in addition to including its ordinary meaning or its meaning known to those skilled in the art, is intended to refer to an isochronous data stream which does not require a preestablished communications link to be established between the source device sending data and the audio device receiving data and does not require acknowledgements or negative acknowledgements to be sent or received.

The following description should be read in view of FIGS. 1-14. FIG. 1 is a schematic view of system 100 according to the present disclosure. System 100 includes a plurality of devices, e.g., at least one source device 102 and a plurality of wireless devices 104A-104F (collectively referred to as "plurality of devices 104", "wireless devices 104," or "devices 104"). In the example shown in FIG. 1, source device 102 is illustrated as a tablet; however, it should be appreciated that the at least one source device 102 can be selected from at least one of: a smartphone, a smarthub, media hub, a stereo hub, a soundbar a headphone case, or any device capable of sending or broadcasting wireless data, e.g., wireless data 122 (discussed below) to each of the wireless devices 104. In some examples, more than one source device 102 may be provided.

Each of the plurality of devices 104 is intended to be a device capable of receiving wireless data from source device 102, and in some examples, utilizing the wireless data to generate audible acoustic energy within the environment surrounding each device, e.g., to generate sound via at least one speaker, e.g., speakers 118 (discussed below). As illustrated in FIG. 1, in some examples, plurality of devices 104 are the respective components of a 5.1 surround-sound system, e.g., a 5.1 Dolby Digital Surround-Sound System. In the example illustrated, devices 104A-104C are front-left, front-center, and front-right speaker assemblies, respectively. Additionally, devices 104D-104E are left-rear or left-surround and right-rear or right-surround speaker assemblies, respectively, and device 104F is a subwoofer speaker assembly. It should be appreciated that plurality of devices 104 can also include wearable audio devices such as wireless headphones, truly wireless headphones, wireless hearing aids, portable speakers, paired speakers or paired portable speakers, as well as a wired or wireless charging case configured to matingly engage with and charge one or more wearable audio devices.

Figure 2:
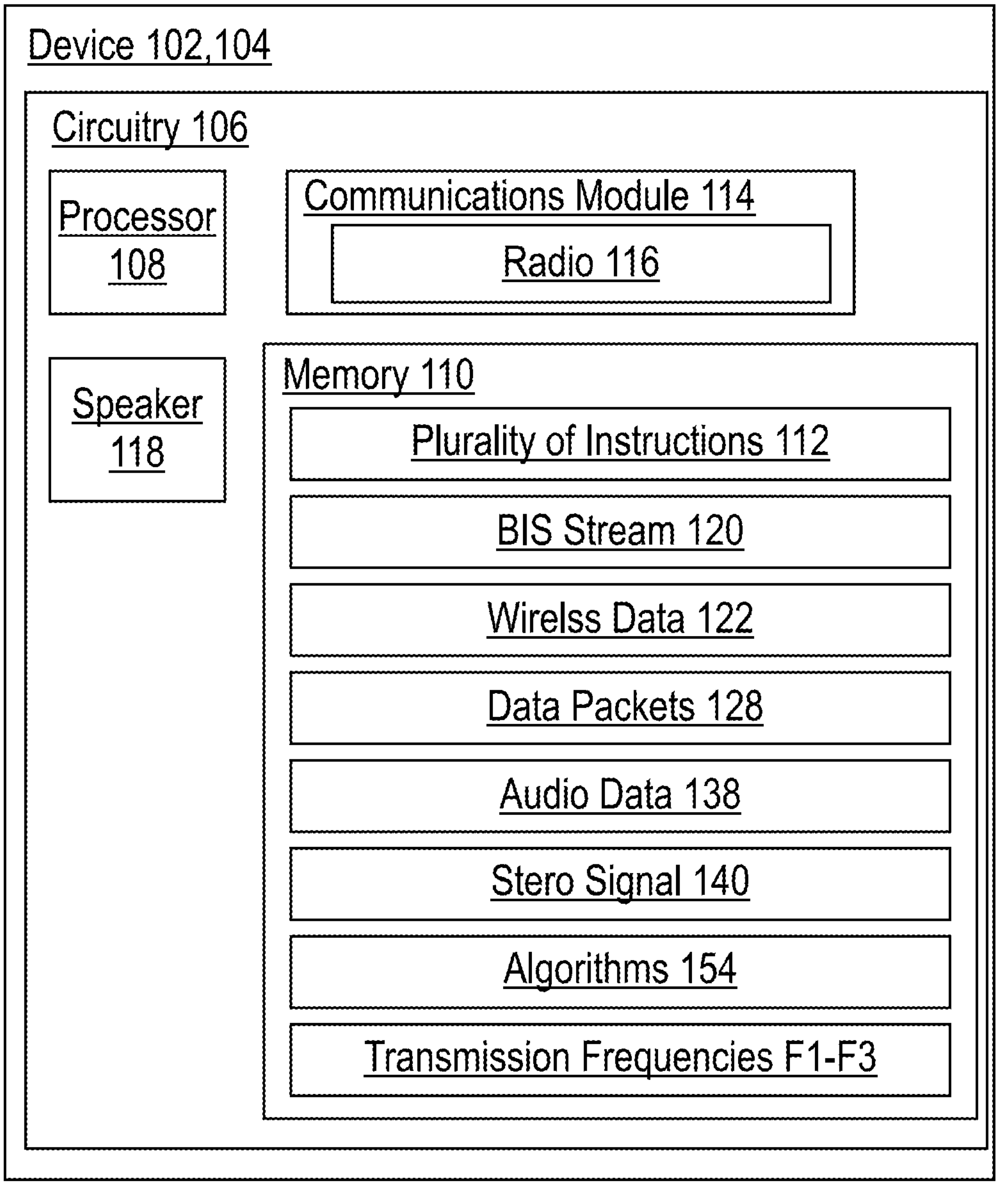
FIG. 2 is a schematic illustration of the components of the devices of the system according to the present disclosure.

As illustrated schematically in FIG. 2, each device of plurality of devices 104 and each source device 102 can each include internal circuitry, e.g., circuitry 106. Circuitry 106 includes a processor 108 and a memory 110 configured to execute and store, respectively, a plurality of non-transitory computer-readable instructions 112, to perform the various functions of source devices 102 and plurality of devices 104 as will be described herein. Circuitry 106 also includes a communications module 114 configured to send and/or receive wireless data, e.g., data relating to at least one of the plurality of wireless data streams discussed below, e.g., BIS stream 120. To that end, each communications module 114 can include at least one radio or antenna, e.g., radio 116 capable of sending and receiving wireless data. In some examples, each communications module 114 can include, in addition to at least one radio (e.g., radio 116), some form of automated gain control (AGC), a modulator and/or demodulator, and potentially a discrete processor for bit-processing that are electrically connected to processor 108 and memory 110 to aid in sending and/or receiving wireless data. As will be discussed below, circuitry 106 of each device 104 can also include at least one speaker, i.e., speaker 118, which is, e.g., a loudspeaker or acoustic transducer, that is electrically connected to processor 108 and memory 110 and configured to electromechanically convert an electrical signal into audible acoustic energy within the environment surrounding each device, e.g., an audio playback. In some examples, the electrical signal and the audible acoustic energy are associated with the data included in the plurality of wireless data streams (discussed below). Furthermore, and although not illustrated, circuitry 106 can include one or more clocks or time-keeping circuits configured to keep independent time during operation of system 100. As one example, each device 104 can synchronize its own internal clock with the internal clock of source device 102 continuously or periodically such that all devices within system 100 can avoid drift between each independent clock and synchronize the receipt, transmission, and retransmission of packets 128 (discussed below). In other words, all devices within system 100 can share time information from their respective clocks and can synchronize each of their clocks to a single, shared, time domain such that the sending and receiving of the packets 128 discussed below, can be synchronized and drift between each device clock can be minimized and/or eliminated.

Each device of system 100, i.e., each source device 102 and each device of plurality of devices 104 may use their respective communication modules to send and/or receive wireless data streams between and among each device, e.g., wireless data stream 120 and wireless retransmission data streams 148A-148C (discussed below). For example, source device 102 can be configured to generate, broadcast, or otherwise wirelessly transmit a wireless data stream 120. Wireless data stream 120 can use various wireless data protocols or methods of transmission e.g., Bluetooth Protocols, Bluetooth Classic Protocols, Bluetooth Low-Energy Protocols, LE Audio protocols, Asynchronous Connection-Oriented logical transport (ACL) protocols, Radio Frequency (RF) communication protocols, WiFi protocols, Near-Field Magnetic Inductance (NFMI) communications, LE Asynchronous Connection (LE ACL) logical transport protocols, or any other method of transmission of wireless data suitable for sending and/or receiving audio and voice data streams. In one example, as will be discussed below in detail, wireless data stream 120 is an isochronous data stream, e.g., a broadcast isochronous stream.

Figure 3A:
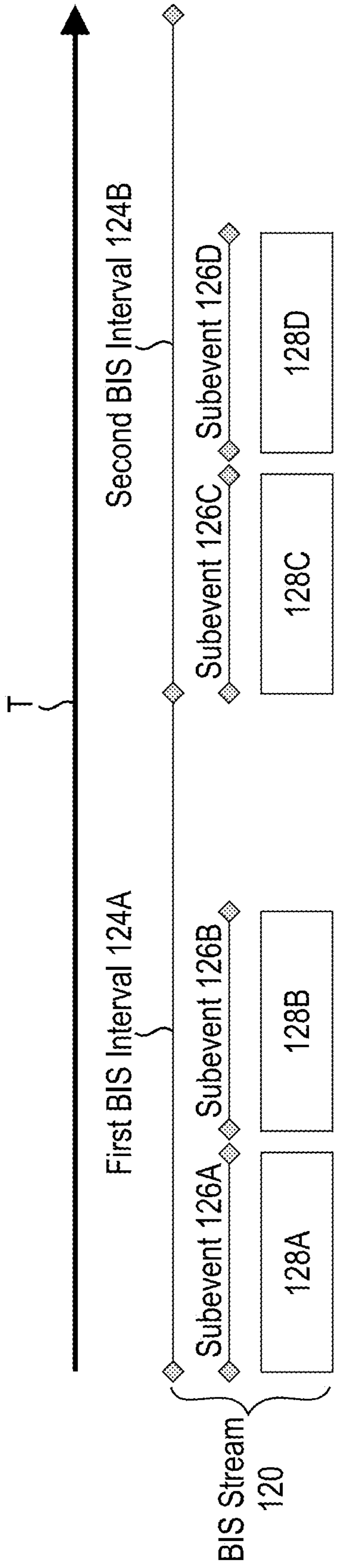
FIG. 3A is a schematic view of a wireless data stream according to the present disclosure.
Figure 3B:
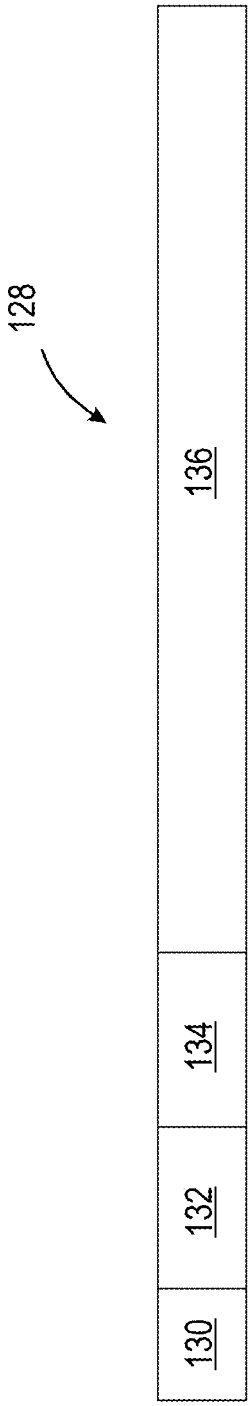
FIG. 3B is a schematic view of a data packet structure according to the present disclosure.

As illustrated in FIG. 3A, wireless data stream 120 (hereinafter referred to as "data stream 120" or "BIS stream 120") transmits or broadcasts wireless data 122 within or during one or more of a plurality of broadcast isochronous stream intervals 124A-124B. As data stream 120 is an isochronous data stream, each broadcast isochronous stream interval has a fixed duration set by the device broadcasting data stream 120. Thus, broadcast isochronous stream intervals 124A-124B cover time intervals of equal duration, where second broadcast isochronous stream interval 124B comes sequentially in time (illustrated by arrow T in FIG. 3A) after first broadcast isochronous stream interval 124A. Within each broadcast isochronous stream (BIS) interval, there are a plurality of subevents. For example, first BIS interval 124A can include subevents 126A-126B and second BIS interval 124B can includes subevents 126C-126D. It should be appreciated that more than two BIS intervals can be utilized, e.g., three, four, five, six, etc., and the quantity and duration of each subevent is dependent on the BIS intervals established by the broadcasting device. Each subevent corresponds to a time period within which one or more devices (e.g., source device 102 or devices 104) can transmit or receive wireless data 122 via one or more data packets 128A-128D (collectively referred to as "data packets 128" or referred to in the singular as "data packet 128"). It should be appreciated that the term "subevent," in addition to its ordinary meaning to those skilled in the art, can also include events sent prior to sending the one or more data packets, e.g., the BIS stream can include pretransmission events or time windows as well as separate events or time windows for repeatedly sending or retransmitting the payload 136 (discussed below). As shown in FIG. 3B each data packet 128 includes a preamble 130, an access address 132, a header 134, and a payload 136. Preamble 130 is the first portion of the packet structure that is transmitted and can include data in the form of one or more bits (e.g., "0" or "1") in a pattern which signifies to a receiving device the start of a packet to be transferred/received. Access address 132 is the second portion of the packet structure that is transmitted and can include data in the form of one or more bits (in some examples 4 bits are used) to identify the data communication and associate the communication with one or more devices, e.g., the access address 132 can be specific to the device intended to receive the communication. Header 134 can include various fields related to the data packet, e.g., header 134 can include a field for the logical transport address (LT_ADDR), a field for packet type, a field for flow control (FLOW), a field for automatic repeat request number (ARQN), a field for sequence number (SEQN), and a field for header error check (HEC). Payload 136 includes the wireless data 122 to be transferred from one device to the other. For example, in some examples, payload 136 can include audio data 138 associated with one or more media files, e.g., media files stored on or sent from source device 102. In some examples, audio data 138 can include data related to multiple channels of a multichannel audio signal, e.g., multiple channels related to each device in a 5.1.

surround sound system. Additionally, audio data 138 can include data related to a stereo audio signal 140 including a left channel signal 142 and a right channel signal 144 to be rendered by one or more devices 104, for example, at a front-left speaker assembly (e.g., device 104A) and a front-right speaker (e.g., device 104C), respectively. In the event that the payloads 136 of the data packets 128 include audio data 138, it should be appreciated that wireless data stream 120 and wireless retransmission data streams 148A-148C (discussed below) can utilize one or more LE audio protocols, as discussed above, and can also utilize the LC3 audio codec for compression of audio data 138 for transmission of the data. For example, the LC3 audio codec can be used in example embodiments where devices 104 are configured as a 5.1 surround sound system.

In operation, source device 102 is intended to broadcast or otherwise transmit a wireless data stream, e.g., BIS stream 120, such that each device 104 can receive and use the wireless data 122 within the payloads 136 of data packets 128, for example, to generate audible acoustic energy or sound. Ideally, each device 104 successfully receives the payloads 136; however, various factors can lead one or more devices 104 to lose, drop, miss, or otherwise fail to receive one or more packets 128 of BIS stream 120. As will be discussed below, in the situations where one or more data packets 128 are not successfully received by one or more devices 104 from the source device 102 in BIS stream 120, one or more retransmission plans or retransmission schemes 146 may be employed, e.g., where one or more devices 104 that successfully received a particular data packet 128 is configured to produce, broadcast, or transmit a wireless retransmission data stream 148A-148C (discussed below) such that a device 104 that did not receive the packet from the BIS stream 120 can nevertheless receive it from the one or more of the wireless retransmission data streams 148A-148C.

The following description should be read in view of FIGS. 4-8. In these figures, schematic notation is used to illustrate sequential and simultaneous or overlapping events. As illustrated by rectangular boxes, each radio (e.g., each radio 116) of each device 104, is either configured or tuned to transmit data (denoted by Tx) or configured or tuned to receive data (denoted by Rx) with respect to each subevent. Thus, each rectangular box shown corresponds to a time window along time T within which a given device can transmit or receive a data packet 128. It should be appreciated that time is represented schematically from left to right in the figures, e.g., two rectangular boxes horizontally adjacent to each other denote two time windows arranged sequentially, i.e., where the left-most window exists prior to the right-most window in time. It should therefore be appreciated that any rectangular boxes or other notation oriented vertically with respect to one another, are intended to be overlapping in time, for example, two boxes depicted vertically, i.e., one directly above the other, is intended to denote two time windows that occur simultaneously. Additionally, for clarity, it should be appreciated that data packets 128 will be denoted in numerical values signifying particular packets, duplicate packets, or retransmitted packets. For example, during first subevent 126A of first BIS interval 124A of BIS stream 120, source device 102 is configured to transmit a packet 1.1 (denoting the first packet of the first BIS interval 124A) and during second subevent 126B of first BIS interval 124A of BIS stream 120, source device 102 is configured to transmit packet 1.2 where packet 1.2 contains a payload 136 that is a copy or duplicate of the payload 136 of packet 1.1. Thus the notation 1.1 refers to the first attempt to transmit a packet with the first payload and the notation 1.2 indicates the second attempt to send a packet with the first payload. As will be discussed below, any retransmitted packets (also referred to as "other data packets"), e.g., packets transmitted in retransmission wireless data streams 148A-148C (discussed below) carry a three digit notation, e.g., 1.1.1, and 1.1.2. The notation 1.1.1 indicates the first attempted retransmission of the first payload while 1.1.2 indicates a second or different attempt to retransmit the first payload.

Figure 4:
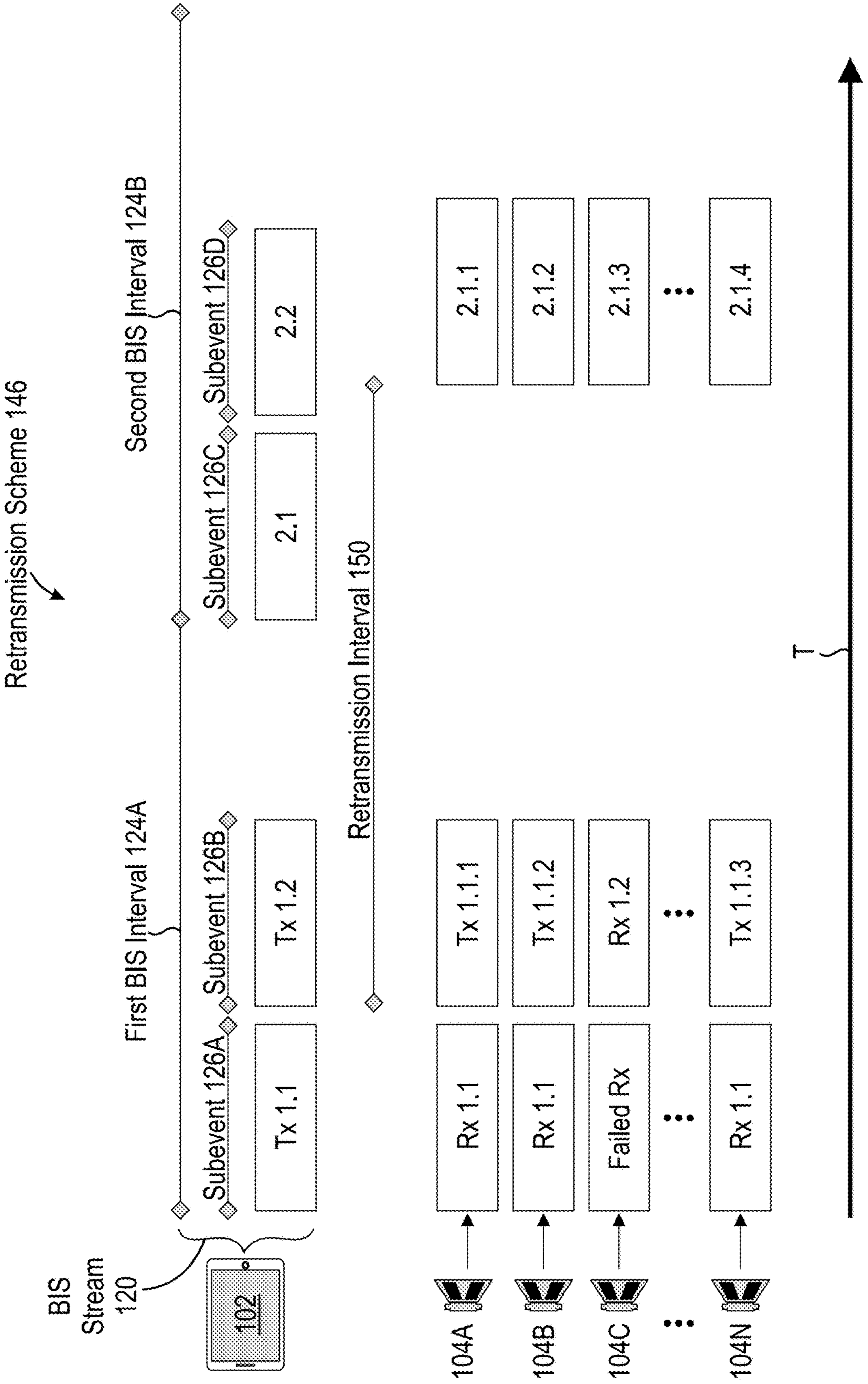
FIG. 4 is a schematic view of a retransmission scheme according to the present disclosure.

FIG. 4 illustrates retransmission scheme 146 where retransmission scheme 146 is an unconditional retransmission scheme. As shown, system 100 can include a source device, e.g., source device 102 (illustrated schematically as a tablet) and a plurality of wireless devices, e.g., devices 104A-104C (depicted schematically as speakers). As shown, it should be appreciated that the present description is not limited to three devices, and can include N number of devices (shown by a vertical ellipsis and corresponding device 104N). As schematically set forth in FIG. 4, source device 102 is configured to produce a BIS stream 120 which includes at least two subevents 126A-126B during a first BIS interval 124A and at least two subevents 126C-126D during a second BIS interval 124B. As illustrated, source device 102 makes two sequential attempts to transmit the first packet of wireless data 122 to all devices 104 over the first and second subevents 126A-126B (indicated by packets 1.1 and 1.2). During the first time window (schematic rectangular box) corresponding with the transmission of packet 1.1 by source device 102, the radios 116 of each device 104A-104N are configured or tuned to receive packet 1.1. As illustrated in FIG. 4, in some examples, one or more devices 104 can fail to successfully receive packet 1.1 during the first time window (denoted by "Rx 1.1"). In this example, although devices 104A and 104B may successfully receive the first packet 128 (denoted as "Rx 1.1"), device 104C may not successfully receive packet 1.1 from BIS stream 120 transmitted by source device 102 (denoted by "Failed Rx"). The failure to receive packet 1.1 can be caused by a number of factors, for example, excessive radio interference, excessive distance between device 104C and source device 102, high signal-to-noise ratio at device 104C, one or more physical barriers between device 104C and source device 102, etc. In this scenario, as depicted, system 100 can utilize an unconditional retransmission scheme 146. In the unconditional retransmission scheme 146, each device 104 that successfully receives packet 1.1 is configured to retransmit, via its own retransmission data stream 148, a retransmitted packet (denoted by the second transmission windows "Tx 1.1.1"-"Tx 1.1.3"), where the retransmitted packet has an identical payload to packet 1.1 and/or packet 1.2. For example, with reference to FIG. 4, once system 100 and/or devices 104A-104B determine that they have successfully received packet 1.1, devices 104A-104B retune or reconfigure their respective radios 116 to transmit and/or broadcast, via their own retransmission data stream, e.g., wireless retransmission data streams 148A-148B, respectively, during a retransmission interval 150. Similarly to data stream 120 transmitted from source device 102, each retransmission data stream 148A-148B is intended to be an isochronous data stream, e.g., a broadcast isochronous data stream. Due to the temporal overlapping between the retransmitted packets and the duplicate packets sent by source device 102, it should be appreciated that, to avoid collisions and interference, BIS stream 120 and each retransmission data stream 148 can be transmitted using a unique frequency or a unique channel, e.g., one of the 40, 2 MHz wide channels provided for Bluetooth LE transmissions. For example, source device 102 can broadcast BIS stream 120 at a first transmission frequency F1 while device 104A can retransmit at a second transmission frequency F2 different than the first transmission frequency F1. Similarly, each successive device 104 can retransmit, when necessary using different transmission frequencies. Therefore, as devices 104A and 104B successfully received packet 1.1 during first subevent 126A, during second subevent 126B devices 104A and 104B are configured to retransmit a packet with an identical payload 136, i.e., packet 1.1.1 and 1.1.2, respectively, via separate broadcast isochronous streams (i.e., retransmission data streams 148A and 148B, respectively), at different frequencies, i.e., at second transmission frequency F2 and third transmission frequency F3, respectively, while device 104C simultaneously remains tuned to receive the duplicate packet 1.2 from source device 102 or one or more of the retransmitted packets, i.e., 1.1.1 or 1.1.2, from devices 104A and 104B, respectively. In the unconditional retransmission scheme 146, all devices are configured to retransmit a successfully received payload 136 regardless of whether any device 104A-104N has failed to receive a packet and thus the retransmission by each device is unconditional. It should be appreciated that although illustrated in FIG. 4 as overlapping with duplicate packet 1.2 from source device 102, any retransmitted packets, e.g., 1.1.1 or 1.1.2 can be sent coincident with, overlapping with, or after any subevent 126 of the BIS stream 120, should the transmission scheme allows for it.

One advantage to the unconditional retransmission scheme 146 described above is that one or more devices 104, e.g., device 104C may be positioned far away from source device 102, or positioned such that there is a large physical barrier between source device 102 and device 104C. In this scenario, it is likely that device 104C will not receive the first or the second attempted packet from source device 102, e.g., packets 1.1 or 1.2. Simultaneously, devices 104A and/or 104B may be positioned such that no such interference or obstruction exists between them and source device 102, and no such interference or obstruction exists between devices 104A-104B and device 104C. By broadcasting a separate retransmission data stream 148 from one or more of the devices 104A-104B, there is a much higher likelihood that device 104C will successfully receive the intended payload from the other devices 104 rather than relying on duplicate transmissions from source device 102 alone. Thus, more robust broadcast schemes can be employed.

Figure 5:
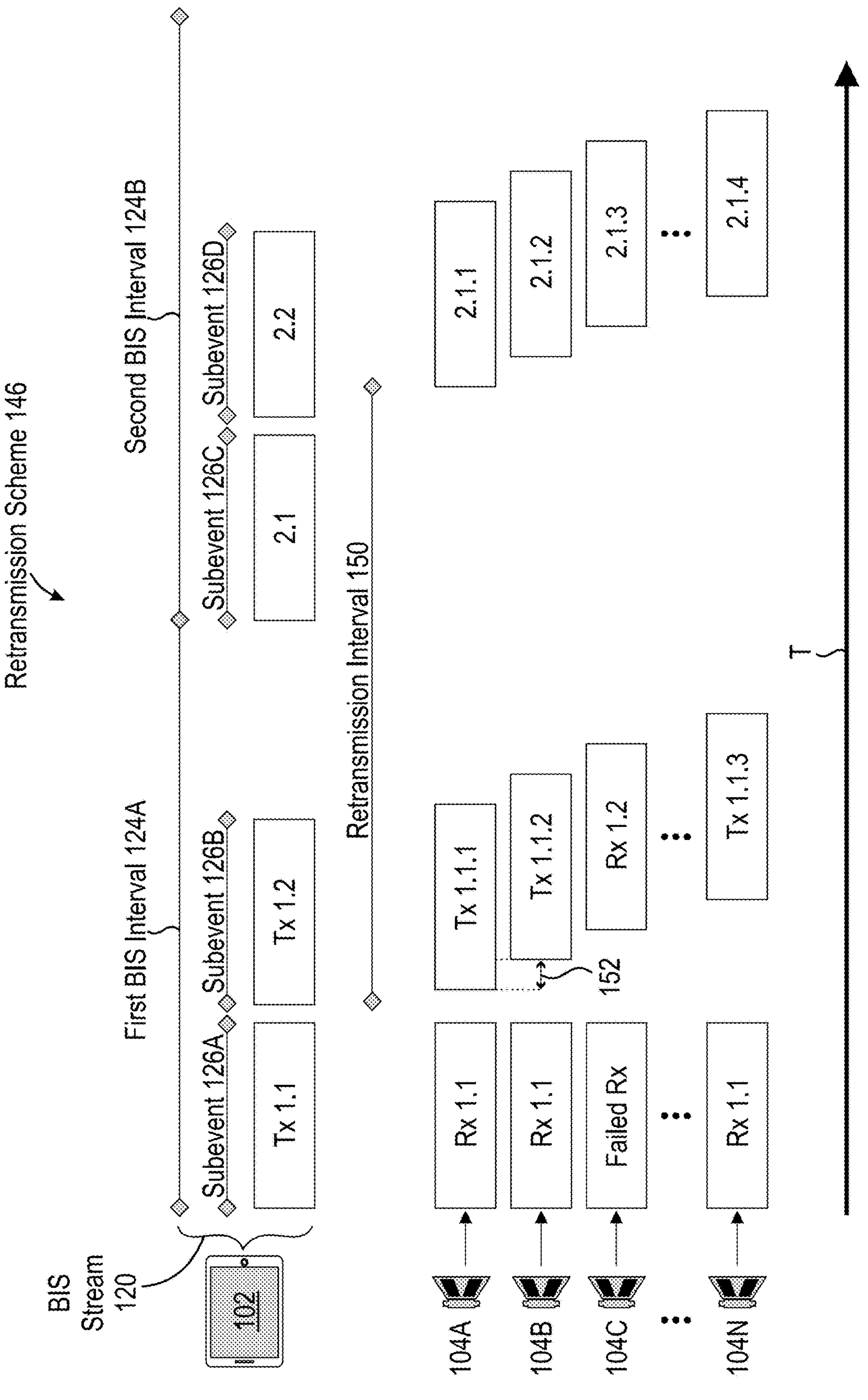
FIG. 5 is a schematic view of a retransmission scheme according to the present disclosure.
Figure 6:
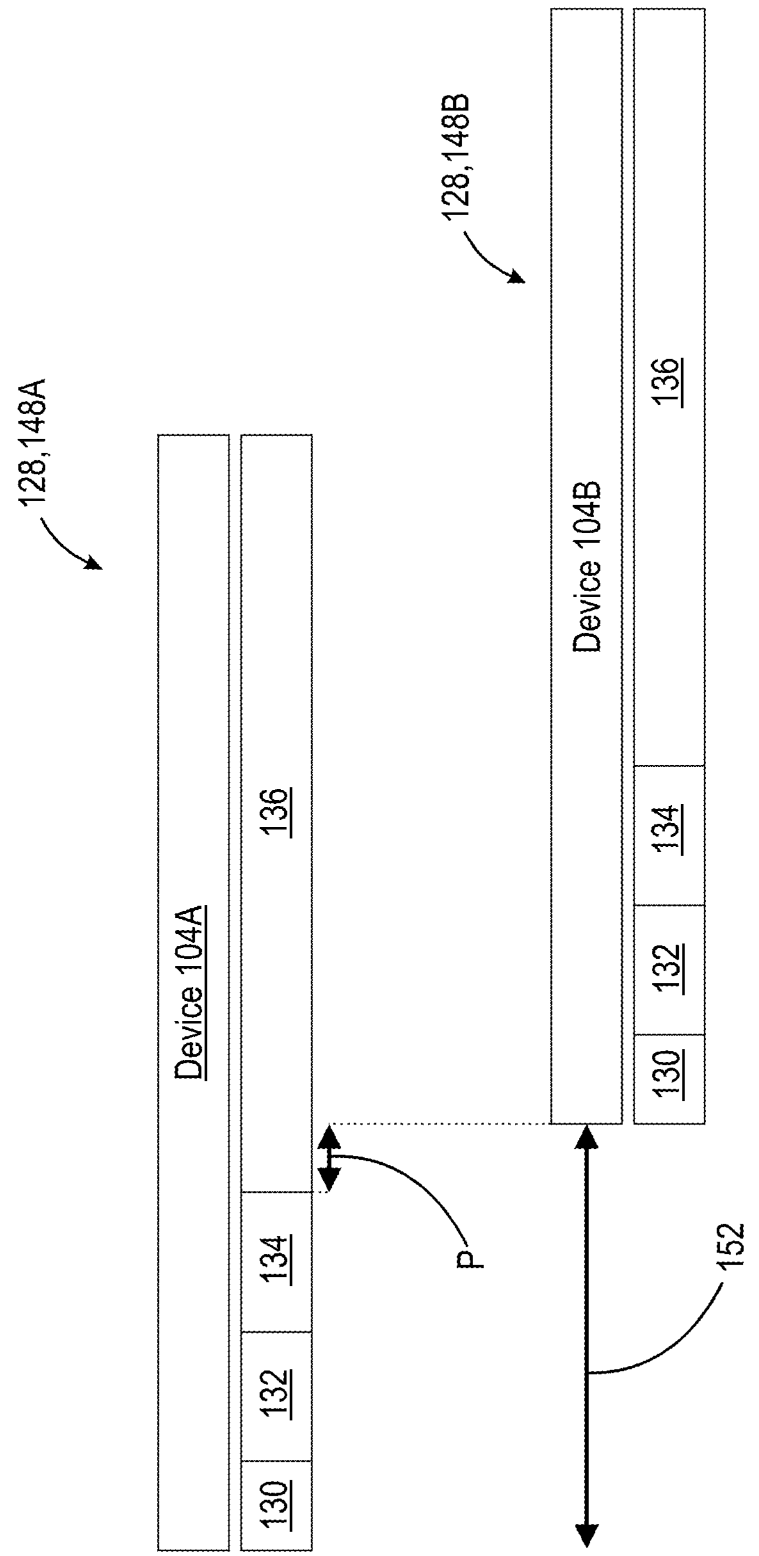
FIG. 6 is a schematic view of the packets of a retransmission scheme according to the present disclosure.

In one example, illustrated in FIGS. 5 and 6, the unconditional retransmission scheme 146 described above can be modified such that the second time windows of each retransmission data stream 148 are temporally offset or shifted with respect to the second time windows associated with the other retransmission data streams 148. For example, rather than generating retransmission data streams 148A-148B using devices 104A and 104B in an overlapping time interval (as illustrated in FIG. 4), a time offset 152 can be employed between all devices 104 such that the second time window for device 104B is shifted with respect to the second time window for device 104A, and the second time window for device 104C is shifted with respect to the second time window of device 104B, etc. Time offset 152 can be a predetermined time offset or a dynamic offset and can be selected from within the range of 80 μs-250 μs, for example, 80 μs, 90 μs, 100 μs, 110 μs, 120 μs, 130 μs, 140 μs, 150, 200 μs, or 250 μs. By temporally shifting the reception windows of each device 104 with respect to each other, this allows the device that has failed to receive the payload 136 of packet 1.1 (e.g., device 104C) to be able to sequentially listen (tune for reception) for a duplicate packet from source device 102 (e.g., packet 1.2), and sequentially listen for a retransmitted packet from each device 104 that produces a retransmission data stream 148 (e.g., retransmitted packets 1.1.1 and 1.1.2 from devices 104A and 104B, respectively) where the duplicate packets and the retransmitted packets do not completely overlap in time. By shifting each reception window, the device listening for a duplicate or retransmitted packet (e.g., device 104C) can listen first for the duplicate packet 1.2 sent from the source device 102 by tuning its radio to listen for the frequency or channel used by source device 102. If device 104C (by failing to receive/read the preamble of duplicate packet 1.2) determines that it will likely fail to receive duplicate packet 1.2, device 104C can retune to listen in on a different frequency or channel corresponding with the next sequential opportunity, e.g., the time shifted retransmission of packet 1.1.1 by device 104A to attempt to receive the missing payload. Similarly, during the time shifted retransmission of packet 1.1.1 by device 104A, should device 104C determine (by e.g., failing to receive/read the preamble of retransmitted packet 1.1.1) that it will likely fail to receive retransmitted packet 1.1.1, device 104C can retune to listen in on a different frequency or channel corresponding with the next sequential opportunity, e.g., the time shifted retransmission of packet 1.1.2 by device 104B. By shifting the second time windows of each device, device 104C can maximize the chances of successfully receiving the missing payload by focusing on one particular duplicate packet or retransmission packet communication at a time and skipping to the next frequency or channel associated with the next opportunity for retransmission should device 104C determine that it is unlikely that it will receive the missing payload from a particular device 104.

FIG. 6 illustrates a schematic view of the second time windows of the retransmission wireless data streams 148A and 148B with time offset 152. As shown, the time offset 152 is large enough to allow device 104C (shown in FIG. 5) to listen for and read/receive the preamble 130, the access address 132 and/or potentially the header 134 prior to deciding to retune for a different opportunity, e.g., prior to listening for the retransmission from device 104B (e.g., packet 1.1.2 shown in FIG. 5). Additionally, there may be an additional amount of time for processing (illustrated by arrow P). By utilizing the foregoing example retransmission scheme 146 in a 5.1 surround sound system, for example, where one device 104 fails to receive a packet but the other five devices successfully receive the packet, the device that failed to receive the packet originally will have six sequential opportunities to receive a duplicate or retransmission packet, e.g., one opportunity from source device 102, and five sequential opportunities from the other devices 104 that successfully receive the packets during the first subevent 126A. In some examples, one or more algorithms 154 can be executed on one or more devices of system 100 to determine which devices 104 the device that missed the packet (e.g., device 104C) should listen in on to maximize its chances of receiving a duplicate or retransmitted packet. For example, the one or more algorithms 154 employed on device 104C can determine the highest average received signal strength indicated (RSSI) signal strength between device 104C and each retransmission data stream 148 and/or BIS stream 120. In addition to or in the alternative to determining RSSI value for a given broadcast, the one or more algorithms 154 can track the number of missed packets for each device 104 to determine which devices 104 have the highest rate of successful receptions of the during each subevent. For example, the one or more algorithms 154 may determine that device 104C frequently misses receiving the first data packet 1.1 during first subevent 126A. As will be discussed below with respect to FIG. 9, the combination of these two analyses can allow the system to establish device pairs, friend pairs, or a predetermined retransmission relationship between devices that routinely or frequently miss or drop packets and devices that routinely receive packets. This relationship can be enhanced by a given friend pair or device pair including at least one device that routinely receives packet 1.1, for example, with a device that routinely misses packet 1.1 where there is a strong or high RSSI value between the two devices of the pair. Thus, the retransmission scheme 146 described above can be further enhanced by analysing the packet transmission information of each device and establishing friend pairs or device pairs to increase the efficiency of retransmission.

Figure 7:
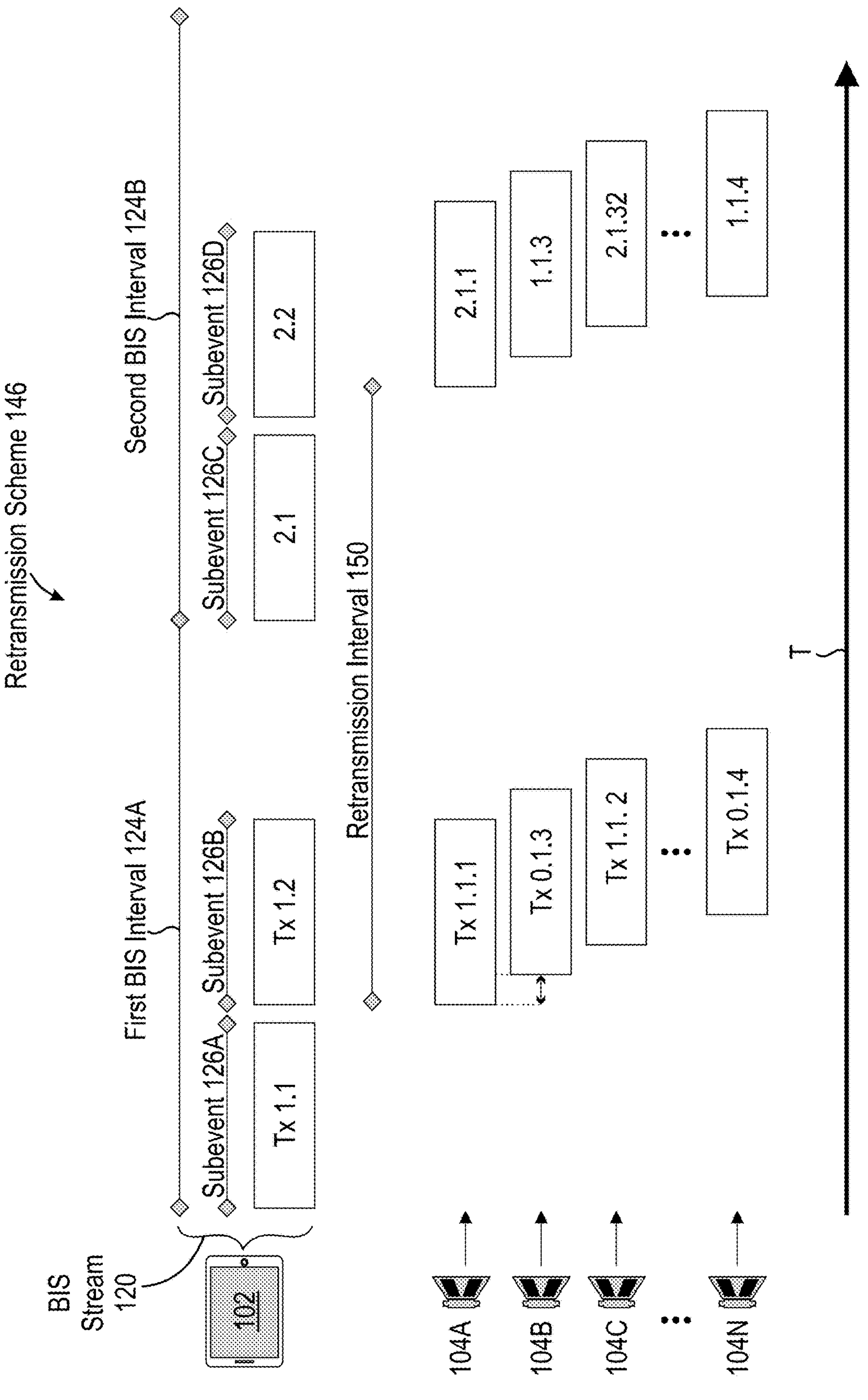
FIG. 7 is a schematic view of a retransmission scheme according to the present disclosure.

In one example, illustrated in FIG. 7, the unconditional retransmission scheme 146 described above can further be modified such that each successive retransmission data stream 148 can include different specific payloads to allow for retransmission of payloads from multiple previous subevents to be retransmitted during a single retransmission interval 150. For example, as shown in FIG. 7, during retransmission interval 150 each device 104A-104C can retransmit, in its own retransmission data stream 148A-148C, respectively, a different specific retransmission packet during retransmission interval 150. As shown, device 104A can retransmit packet 1.1.1, device 104B can retransmit packet 0.1.3, device 104C can retransmit packet 1.1.2. This pattern can be extended to include every device 104A-104N illustrated by retransmitted packet 0.1.4 associated with device 104N. This differentiated unconditional retransmission scheme 146 can also carry over to the next BIS interval, i.e., second BIS interval 124B where each device 104A-104N can continue to retransmit different, specific, packets during their respective retransmissions. The differentiate packet retransmissions of each retransmission data stream 148 can be based on data obtained prior to runtime of the system 100, e.g., it may be known that devices 104A and 104B are arranged close to source device 102 and therefore retransmission data streams 148A and 148B can consistently provide retransmitted packets for other devices within system 100 rather than the same retransmitted packets. Alternatively, this analysis could occur dynamically, i.e., during runtime of system 100 based on packet receive/loss rates or RSSI value as discussed above.

In addition to the low complexity operation discussed above, further advantages of the unconditional retransmission scheme 146 include that the transmission order of each device 104 can be pre-programmed, i.e., arranged prior to runtime. Also, the foregoing systems and retransmission scheme 146 will function equally well if one or more devices are missing, disconnect, or lose power. The additional advantages afforded by the differentiated unconditional retransmission schemes describe above include the additional control of selective reception of which packets are in need of retransmission. Additionally, the system is less sensitive to bursts of periodic noise as the retransmissions are available over a longer total period of time. Moreover, the increased control of which packets are retransmitted allows for selective reception of different packets or packet fragments that may complete or fill in gaps in fragmented or incomplete audio frames.

Figure 8:
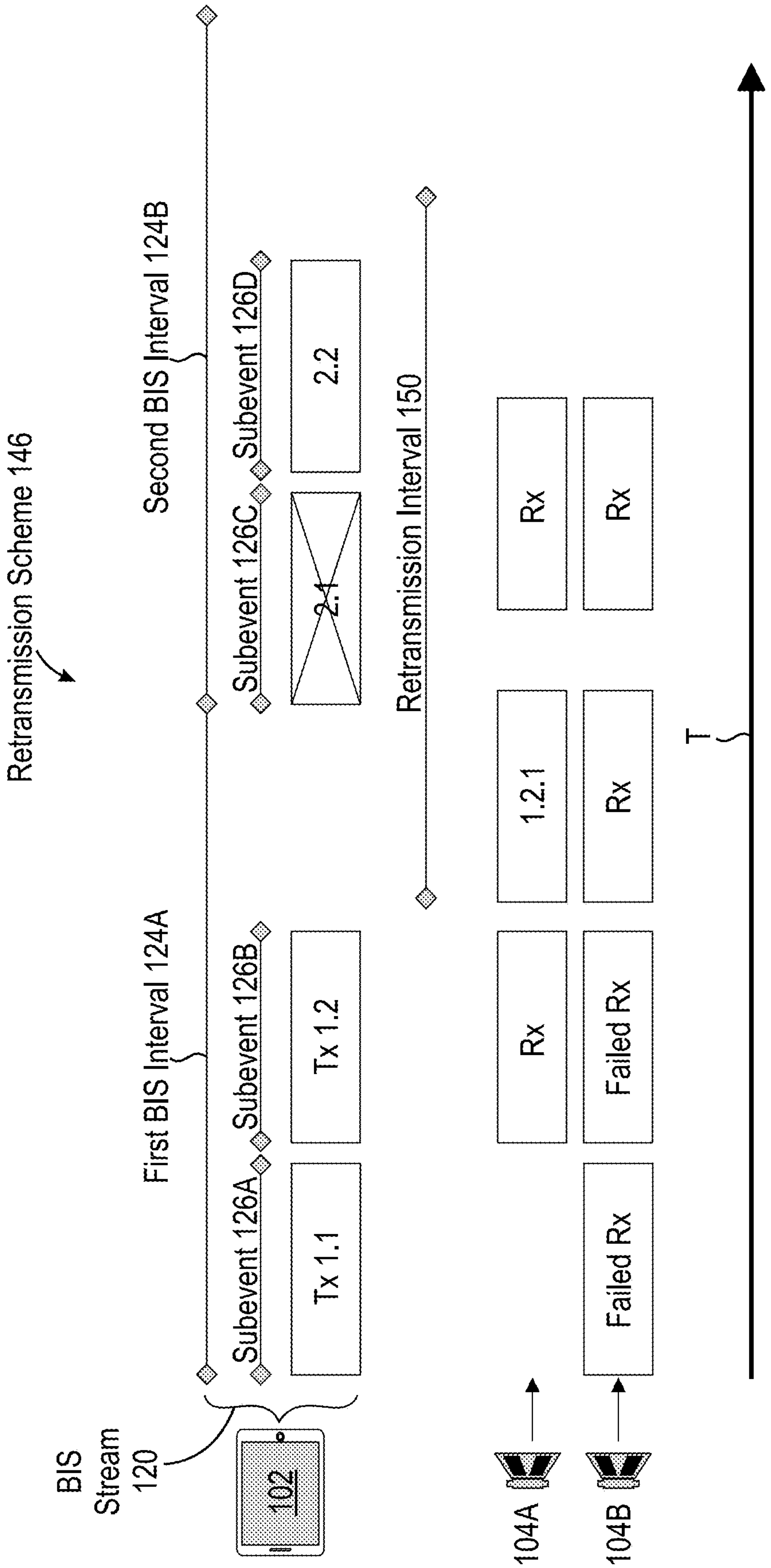
FIG. 8 is a schematic view of a retransmission scheme according to the present disclosure.

In addition to the implementations of the unconditional retransmission schemes 146 discussed above, one extension of these concepts allows a device 104 that routinely fails to receive packets during subevents 126A-126B, for example, to sacrifice its own ability to receive the next packet from source device 102 during a second BIS interval in favor of receiving a retransmission of the previous packet during the second BIS interval. For example, as illustrated in FIG. 8, should the free air time between the end of the first BIS interval 124A and the beginning of second BIS interval 124B be small, e.g., smaller than a retransmission time window, device 104A (which successfully received either first packet 1.1 or the duplicate of first packet 1.2 (as shown) can decide to retransmit the packet (as packet 1.2.1) during and overlapping with the subevent 126C of the second BIS interval 124B. Thus, should device 104B recognize that its connection with source device 102 is poor or unreliable, device 104B can decide to prioritize receipt of a retransmission from a more reliable device, i.e., device 104A, and sacrifice its ability to receive packet 2.1 from source device 102 in the next subevent.

Figure 9:
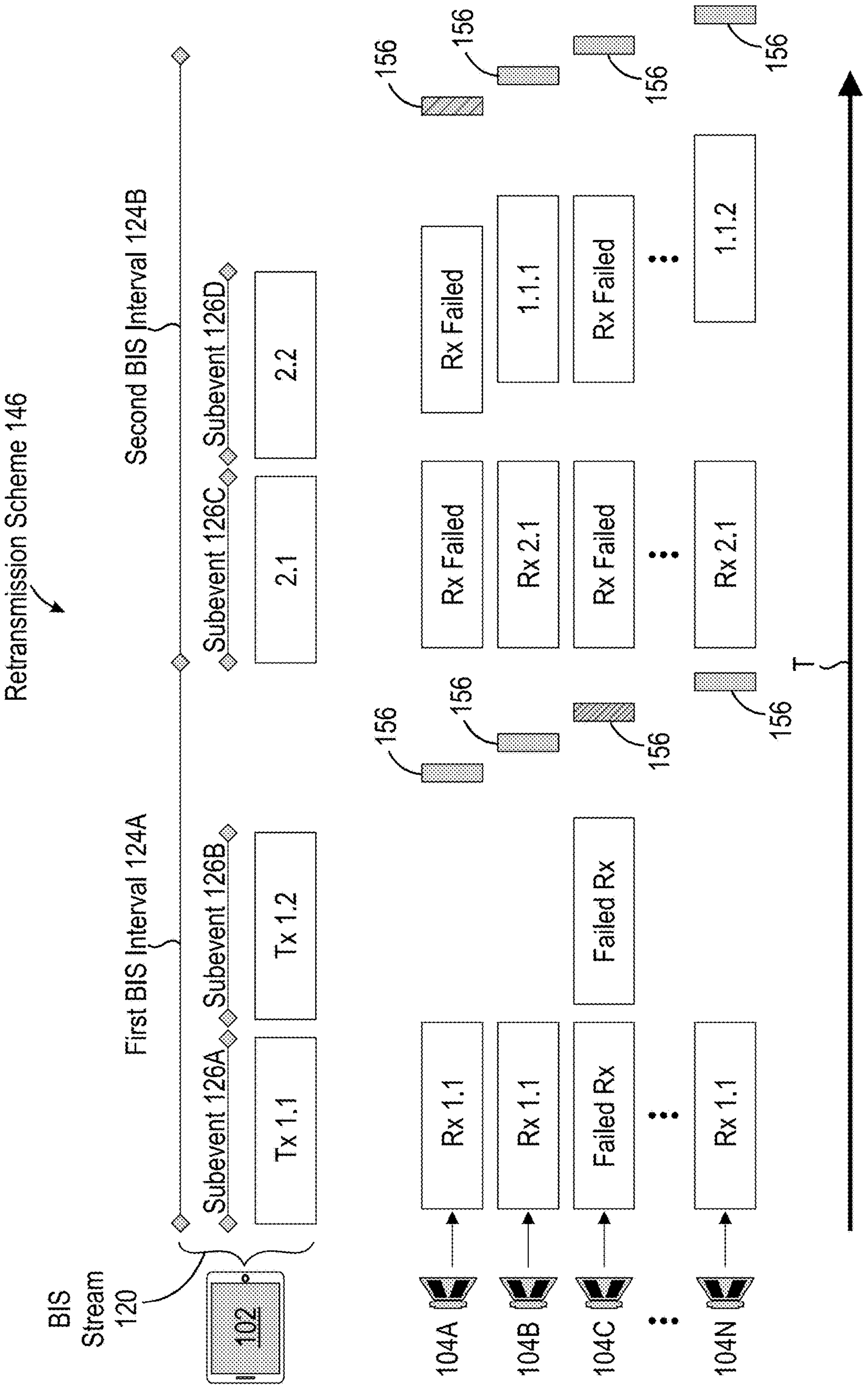
FIG. 9 is a schematic view of a retransmission scheme according to the present disclosure.

In the alternative to (or in addition to) the unconditional retransmission schemes discussed above, retransmission scheme 146 can be conditional, e.g., where each particular device 104 is configured to generate or transmit a retransmission data stream 148 only when one or more devices 104 have failed to acknowledge receipt of a packet from source device 102, i.e., from BIS stream 120. As shown in FIG. 9, each device 104A-104N is configured to acknowledge, via an acknowledgement 156, that it has successfully received the packet 128 and/or the payload 136 for each packet transmitted in BIS stream 120 from source device 102. Acknowledgements 156 can take the form of a separate packet of data or a burst of energy, e.g., a burst of radio waves that can be received by the other devices of system 100. If one or more devices 104A-104N fails to acknowledge receipt of the first payload (either from packet 1.1 or duplicate 1.2) or provides an acknowledgement 156 that indicates that it failed to successfully receive the first payload, then any device that successfully received the first payload during first BIS interval 124B and receives the second payload from the next subevent 126C of second BIS interval 124B will retransmit the missing packet via a retransmission data stream 148. For example, as illustrated in FIG. 9, devices 104A and 104B successfully receive the first payload during the first subevent 126A shown by acknowledgements 156. However, device 104C can fail to acknowledge receipt of packets 1.1 and 1.2 during the first and second subevents 126A-126B or acknowledge the failure to receive packets 1.1 and 1.2 (shown as a rectangular box with cross-hatchings in FIG. 9). By providing this acknowledgement 156 that device 104C is missing the first payload, devices 104A and 104B will know that device 104C is missing a payload that they had previously received. Either or both of devices 104A and 104B that successfully receive the second payload from packet 2.1 during subevent 126C of second BIS interval 124B can then utilize their second time window (corresponding to subevent 126D) to provide a retransmission data stream 148A to broadcast the first payload in an attempt to allow device 104C to receive the first payload during the second BIS interval 124B. As shown in FIG. 9 only device 104B successfully receives packet 1.1 and packet 2.1 during the first BIS interval 124B and during subevent 126C, respectively. Thus, during subevent 126D, only device 104B will provide a retransmission data stream, i.e., retransmission data stream 148B which will include retransmission packet 1.1.1. It should be appreciated that, although failing to receive packets from BIS stream 120, device 104C can listen for acknowledgements from the other devices 104 and tune its radio 116 to the frequency or channel that the retransmitting device utilizes, for example, to the frequency or channel that device 104B uses to retransmit. Additionally, although able to receive packet 1.1 during subevent 126A, there is no guarantee that device 104A will receive the second payload/second packet 2.1 (or duplicate 2.2). As shown, device 104A can miss, drop, or lose the second packets and provide an acknowledgement 156 informing the other devices 104 that it failed to receive the second packet in subevents 126C and 126D. Thus, during the next BIS interval (not shown) a device that successfully received the second payload and successfully receives the third payload during the first subevent of the next BIS interval can retransmit the missing packet.

It should be appreciated that the conditional retransmission scheme discussed and illustrated herein can also benefit from the differentiated retransmission and/or sacrifice retransmission modifications discussed above with respect to the unconditional retransmission scheme described and illustrated with respect to FIGS. 7-8. For example, with respect to FIG. 9, during second BIS interval 124B the retransmitted packets shown, e.g., packet 1.1.1 retransmitted by device 104B and retransmitted packet 1.1.2 could take the form of different packets rather than as retransmitted copies of the same payload. Similarly, one or more devices 104 could sacrifice their ability to receive the next packet during the next subevent in favor of receiving a retransmitted packet by one or more of the other devices 104 as discussed above. Additionally, the one or more algorithms 154 may determine that a particular device 104 frequently misses packets from BIS stream 120 while a different device 104 routinely receives packets from BIS stream 120. The one or more algorithms 154 can establish device pairs or friend pairs between these devices, e.g., to inform the sacrifice retransmission modifications discussed above.

Figure 10:
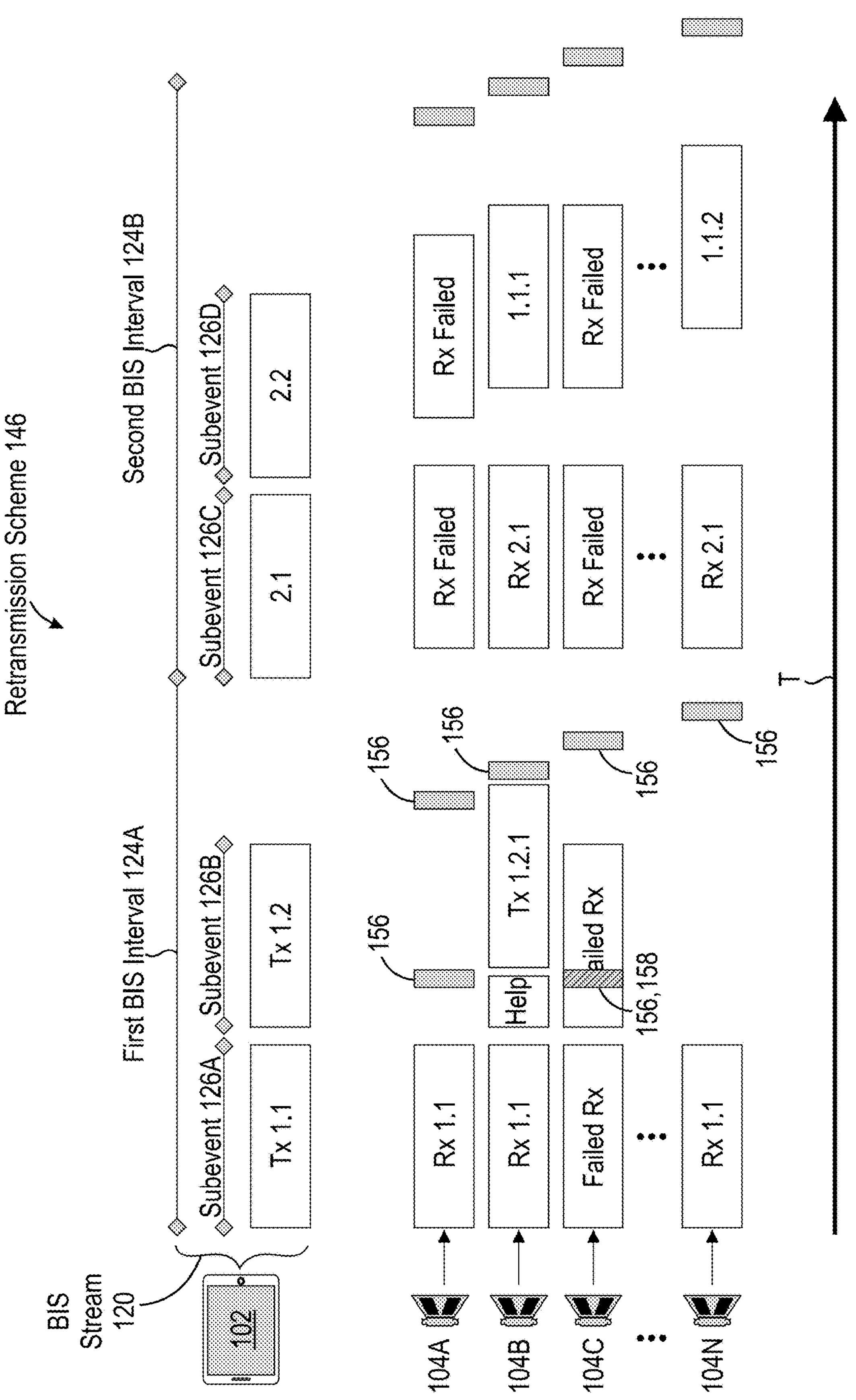
FIG. 10 is a schematic view of a retransmission scheme according to the present disclosure.
Figure 11:
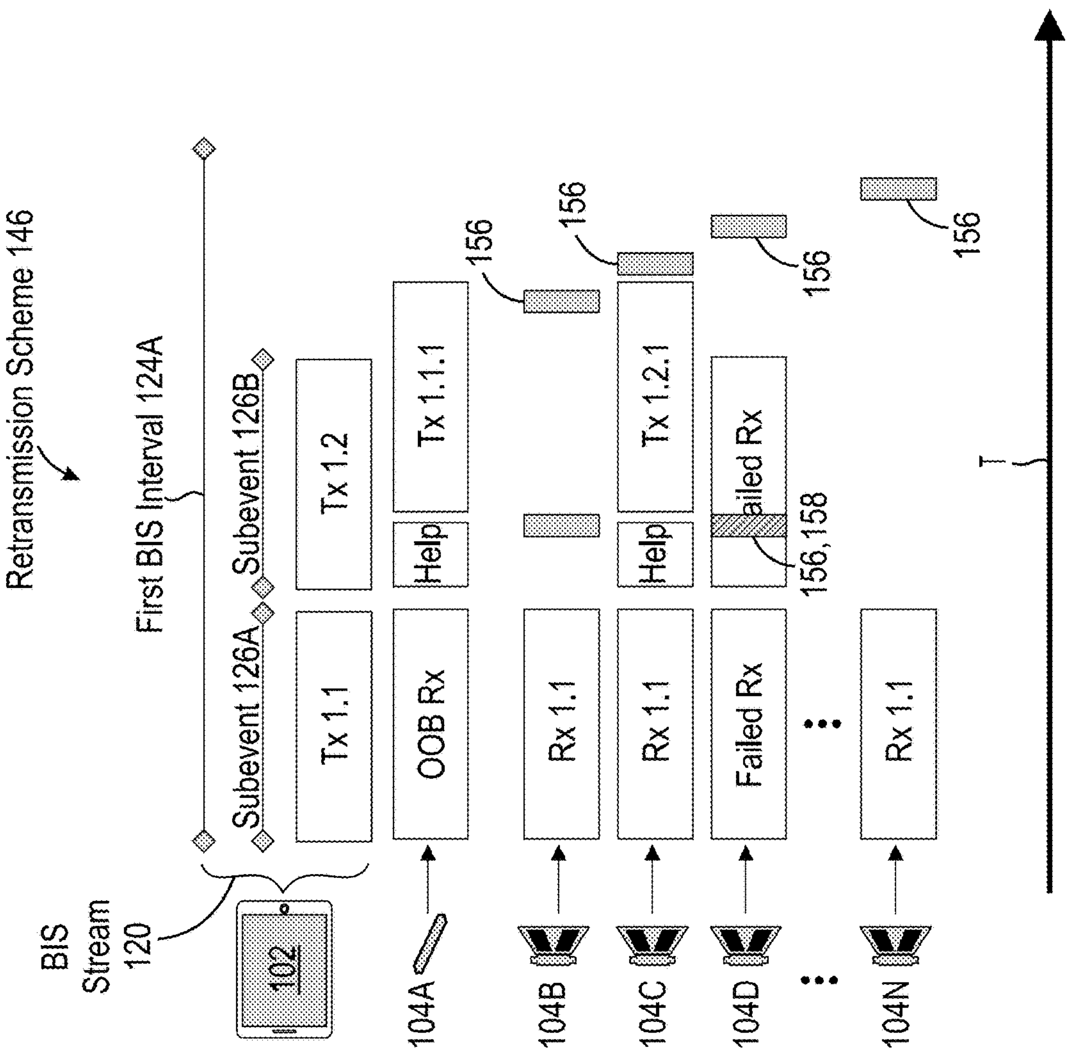
FIG. 11 is a schematic view of a retransmission scheme according to the present disclosure.

As illustrated in FIGS. 10 and 11, in the conditional retransmission schemes discussed herein, a device that fails to receive a packet can call for help or send a help request 158 to the other devices 104 (or source device 102) of system 100 such that those devices can provide the missing packet during the next retransmission event. As shown in FIG. 10, device 104A-104C can be configured to acknowledge, via one or more acknowledgments 156, that they successfully received a particular sent packet or whether they failed to receive a particular sent packet. Rather than waiting until after the second subevent 126B to send the acknowledgment during the free air time illustrated, devices 104A-104C may successfully receive the first packet/payload during the first subevent 126A. Thus, acknowledgements 156 can be sent during second subevent 126B. As shown, should any device 104 determine that it has failed to receive packet 1.1, and can determine that it will likely not receive the duplicate packet 1.2 (by recognizing that it failed to receive the preamble of packet 1.2), that device can send an acknowledgement 156 that includes a request for help 158, i.e., a request indicating that a particular device failed to receive the first packet during the first subevent 126A and second subevent 126B. Upon receiving such a request, any device that successfully received packet 1.1 during the first subevent 126A can begin retransmitting during or proximate to the second subevent 126B. As illustrated in FIG. 10, during the first subevent 126A, at least devices 104A and 104B successfully receive packet 1.1 (denoted by "Rx 1.1"), while device 104C fails to receive packet 1.1 and knows that it will fail to receive packet 1.2 (due to failure to read or receive the preamble 130 of duplicate packet 1.2). During the second subevent 126B, device 104A can acknowledge, via an acknowledgment 156, that it successfully received packet 1.1 during first subevent 126A, while device 104C can acknowledge, via an acknowledgement 156, that it failed to receive packet 1.1 during the first subevent 126A and will fail to receive duplicate packet 1.2 during second subevent 126B. As shown schematically, device 104B, that successfully received packet 1.1 during subevent 126A, can listen for requests 158 for help (shown schematically by a box denoted with "Help") from any devices 104 that signal that they failed to receive packet 1.1. During that help time window, device 104B will recognize that device 104C failed to receive packets 1.1 and 1.2. Thus, during subevent 126B, and after the help time window ends, device 104B can immediately begin retransmitting a retransmission packet (denoted as 1.2.1) so that device 104C, that called for help, can have a new opportunity to receive the first payload. Devices 104 that have previously been paired, i.e., as device pairs or friend pairs, can listen for requests or calls for help from their paired device.

As shown in FIG. 11, one of more devices 104 can communicate with source device 102 via a separate connection or broadcast that is outside of the normal Bluetooth band used for the broadcast isochronous streams discussed herein. For example, device 104A can be a soundbar or other device 104 that is configured to receive one or more packets 128 via a separate connection, e.g., a direct cable connection such as an HDMI cable connection or via a wired or wireless communication that is outside of the Bluetooth broadcast band such as Wi-Fi. As device 104A can received packets 128 from source device 102 via this direct wired transmission, device 104A can receive packets 128 with a high reliability. Thus, during operation, device 104A can listen for requests 158 for help from the other devices 104, e.g., devices 104B-104N. As shown in FIG. 11, if device 104D provides an acknowledgement 156 that includes a request for help 158 during the second subevent 126B that indicates device 104D failed to receive packet 1.1 and has failed to read the preamble 130 of duplicate packet 1.2, then both device 104A and device 104C can listen for the help request (denoted by rectangular boxes labelled "Help") and retransmit the payload from the missing packet in a retransmission event. For example, should all devices except device 104D acknowledge receipt of packet 1.1 during first subevent 1.1, then devices 104A and 104C can begin retransmission of a retransmission packet having the missing payload in the regular Bluetooth broadcast band or channel used for the broadcast isochronous streams discussed herein, such that device 104D can receive a retransmission packet from either device 104A (denoted as 1.1.1) or device 104C (denoted as 1.2.1) during the second subevent 126B.

Figure 12A:
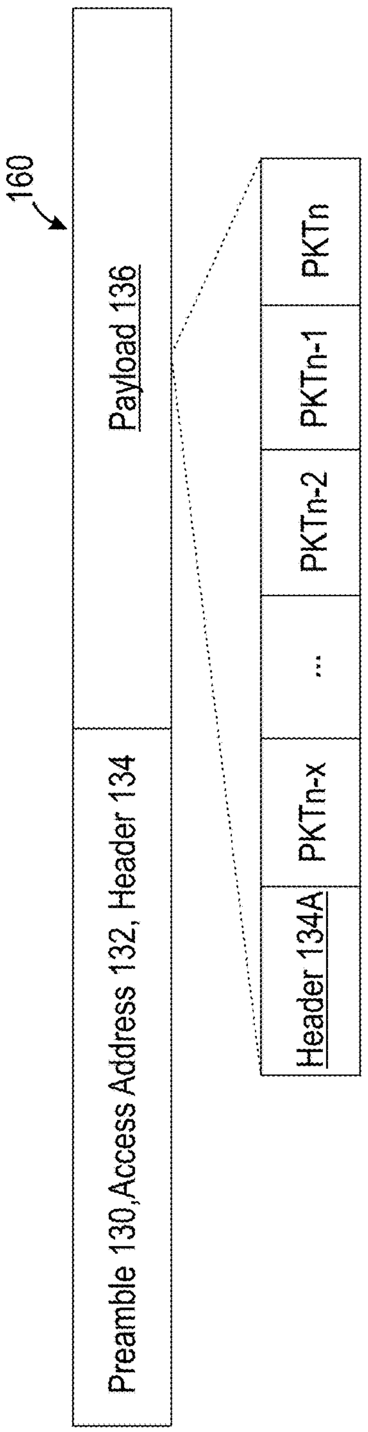
FIG. 12A is a schematic view of a data packet structure according to the present disclosure.

For the conditional retransmission schemes discussed above, retransmission scheme 146 can utilize a block acknowledgements 160 to share retransmission data and/or retransmission plans between the devices of system 100. For example, as shown in FIG. 12A, in examples where acknowledgement 156 is a packet rather than a burst of radio energy, the structure of the acknowledgement packet can take the form of a block acknowledgement 160. In the structure illustrated, payload 136 can be a bitfield where each bit represents reception of a specific packet and whether it was successfully received or whether the packet reception failed. As illustrated in FIG. 12A, payload 136 can include a header 134A with device specific information such as rankings or device order (e.g., the order of delayed transmissions discussed above), as well as separate portions of the bitfield dedicated to indicating successful receipt or failure to receive each packet since the beginning of the stream, or for a predetermined number of previous packet attempts. FIG. 12A illustrates that N number of packets may have been sent since the beginning of a particular stream, e.g., BIS stream 120. The first field (farthest to the right in FIG. 12A denoted as "PKTn") is devoted to recording whether packet N (the latest packet in time) was received or not. Moving to the left of the first field, the second field (denoted as "PKTn−1") is devoted to recording whether the packet broadcast immediately prior to packet N was received, i.e., packet N−1. To the left of the second field is the third field (denoted as "PKTn−2") which is devoted to recording whether the packet b broadcast immediately prior to packet N−1 was received, i.e., packet N−2. This pattern can continue through N-X number of packets, where N-X represents the total number of packets sent in BIS stream 120 and/or a predetermined number of packets. It should be appreciated that the structure of the block acknowledgement 160 may include and track reception of packets by one or more of the devices 104 of system 100. For example, each block acknowledgment 160 can include within its bitfield a history of packet failures and successful receipts of all packets for each device 104 of the system.

Figure 12B:
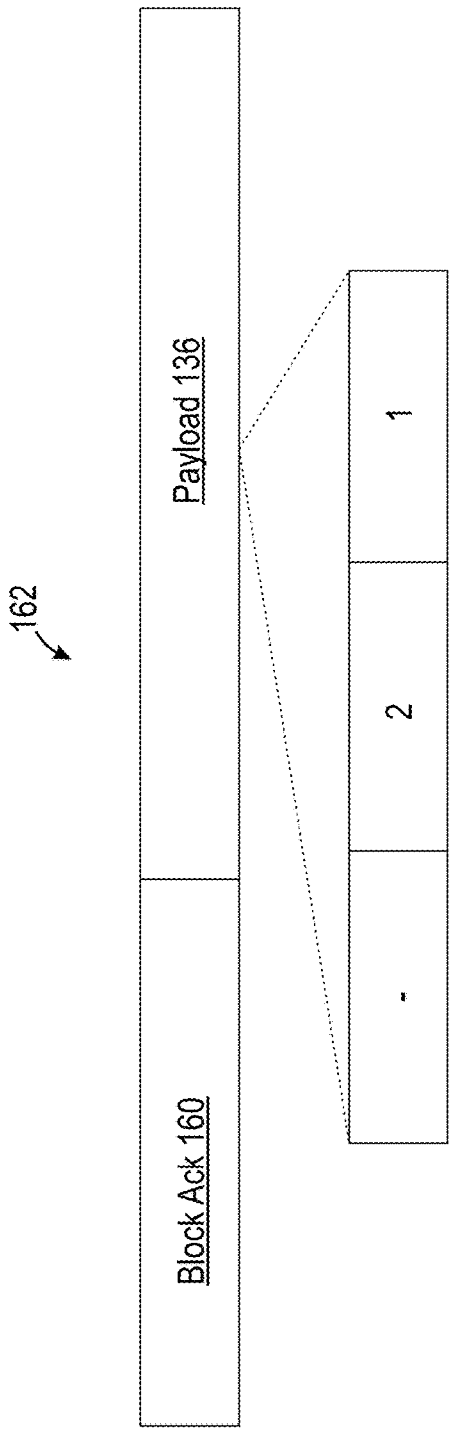
FIG. 12B is a schematic view of a data packet structure according to the present disclosure.

FIG. 12B illustrates a retransmission plan, e.g., retransmission plan 162, that incorporates the block acknowledgements 160 for each device 104 as well as the order and content of retransmissions needed. As shown, one or more device 104 could share within a given retransmission or within a given acknowledgement 156, the block acknowledgement information of one or more device 104. Should it be determined from the block acknowledgment 160 that, for example, one or more device missed or failed to receive the first and second payloads (e.g., the payloads associated with packets 1.1 and 2.1), the retransmission plan can include instructions to all devices 104 that a retransmission packet is needed for the first payload and the second payload. Retransmission plan 162 may include the order of retransmission of these payloads and/or which device or devices 104 will be responsible for the retransmission of a given packet/payload. As illustrated in FIG. 12B, it can be determined from block acknowledgement 160 that one or more devices 104 within system 100 is missing the first and second payload, and retransmission plan 162 can include that the second payload (denoted by the box with a "2") will be sent prior to the retransmission of the first payload (denoted by the box with a "1"). It should be appreciated that when sending acknowledgements 156 and generating block acknowledgement 160, each device can layer or add on data related to their previous acknowledgements and failed/received packets to generate the cumulative block acknowledgment data discussed above.

Figure 13:
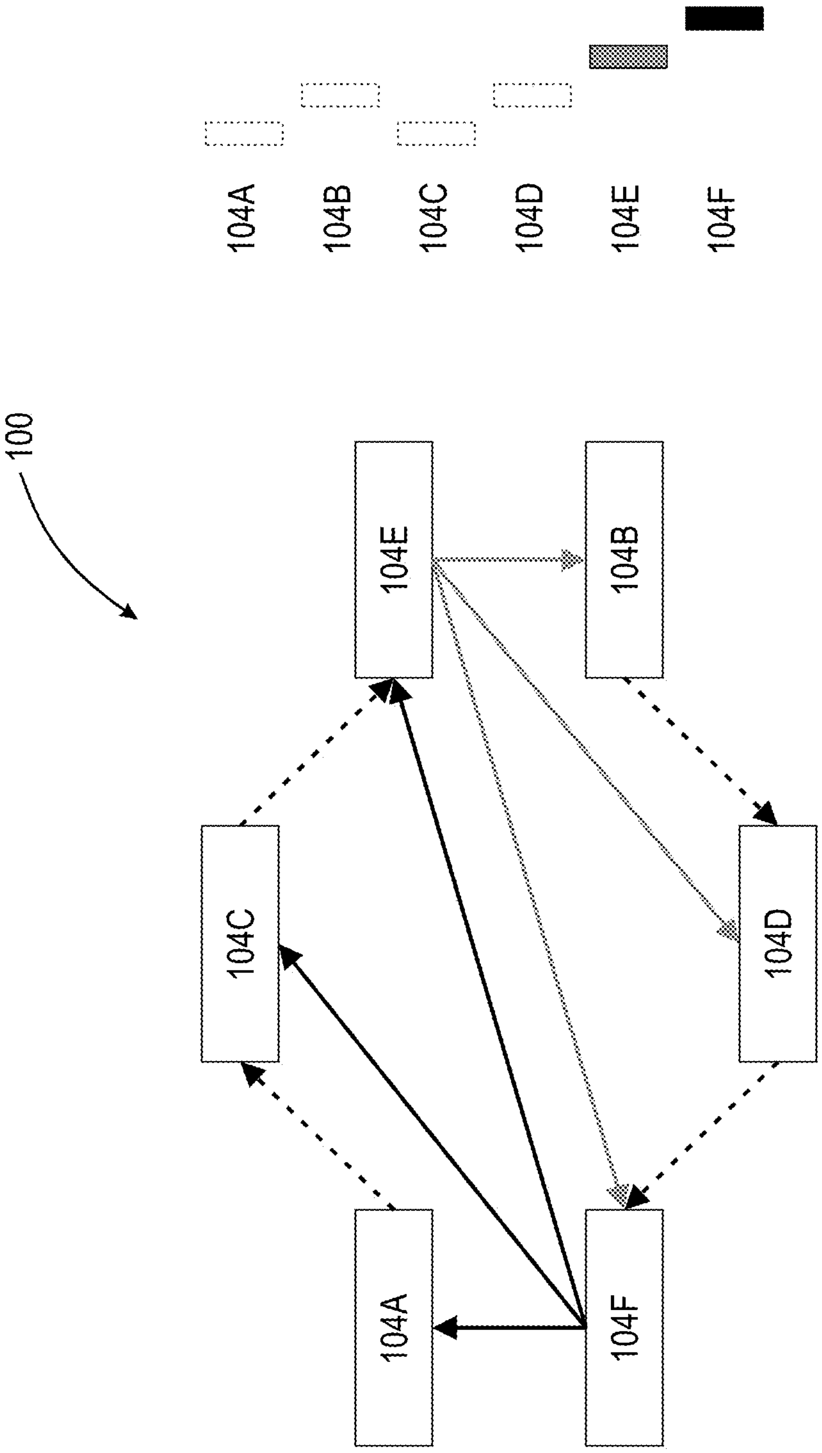
FIG. 13 is a schematic view of an optimized data sharing plan according to the present disclosure.

In one example, the cumulative sharing of the data associated with block acknowledgement 160 or the data associated with retransmission plan 162 can be optimally distributed among the devices 104 of system 100 such that total sharing air time is minimized. Since each device can receive the block acknowledgement data from another device 104 within system 100 and layer or add on to the data from the previous device 104, the air time needed to share all information with all devices can be minimized. As illustrated in FIG. 13, six devices 104A-104F can be provided. Here, in a first operation, device 104A shares its acknowledgement and retransmission plans 162 with device 104C and device 104C shares the acknowledgement and retransmission plans 162 for devices 104A and 104C with device 104E (illustrated by dotted lines in FIG. 13). Simultaneously, device 104B shares its acknowledgement and retransmission plans 162 with device 104D and device 104D shares the acknowledgement and retransmission plans 162 for devices 104B and 104D with device 104F (also illustrated by dotted lines in FIG. 13). By the end of the first operation device 104E is responsible for a single cumulative acknowledgement and retransmission plan 162 for devices 104A, 104C, and 104E (as they have all been layered on top of each other). Similarly, by the end of the first operation, device 104F is responsible for a single cumulative acknowledgement and retransmission plan 162 for devices 104B, 104D, and 104F. In the next operation (illustrated by solid grey lines in FIG. 13), device 104E shares the cumulative acknowledgement and retransmission plan 162 for devices 104A, 104C, and 104E with devices 104B, 104D, and 104F. Additionally, during a third operation (illustrated by solid black lines in FIG. 13) device 104F shares the cumulative acknowledgement and retransmission plan 162 for devices 104B, 104D, and 104F with devices 104A, 104C, and 104E. Thus, by the end of the third operation all devices 104E and 104F are aware of the retransmission plans for the entire collection of devices 104A-104F. It should be appreciated that the layering plan sharing schemes discussed above can utilize a circular retransmission order, e.g., where each device layers onto the previous device plan before saring to the next until the last device is responsible for a single cumulative plan, or could use a tree pattern where only certain devices are responsible for cumulative plans for certain other devices.

Figure 14:
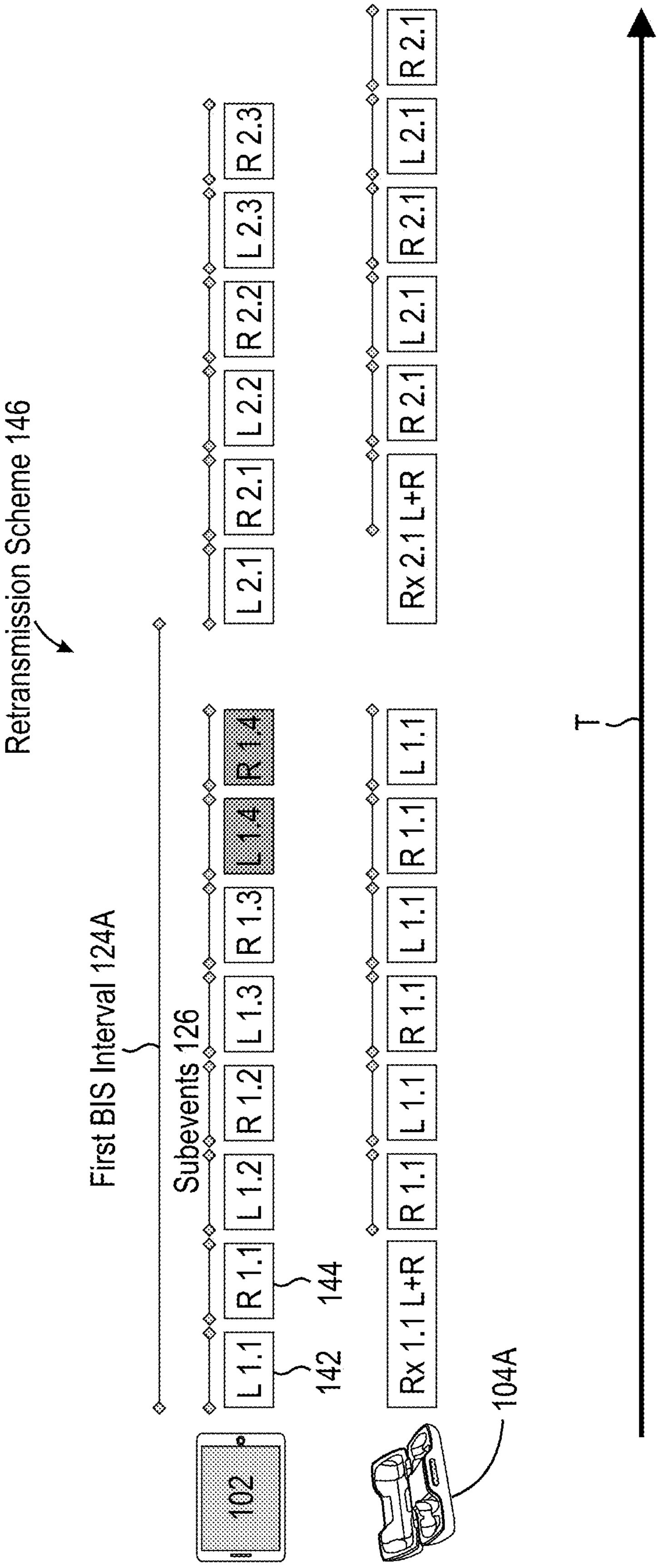
FIG. 14 is a schematic view of a retransmission scheme according to the present disclosure.

In some examples, the retransmission schemes 146 discussed above, can be utilized to send stereo audio data 138 to a pair of wireless headphones, e.g., truly wireless earbuds. For example as illustrated in FIG. 14, source device 102 can be a tablet or smartphone, while device 104A can be a wireless charging case configured to matingly engage with and charge devices 104B and 104C (not shown) which can be the right and left earbuds of a pair of truly wireless earbuds associated with the charging case 104A. Here, source device 102 is configured to broadcast, e.g., via BIS stream 120, audio data 138 associated with stereo audio signals, i.e. a left channel stereo signal 142 and a right channel stereo signal 144 (denoted by L and R in FIG. 14). Similarly to the notation above, the left and right stereo signal packets are sent sequent and thus L 1.1 denotes the first attempt to send the first left-channel-specific payload while R 1.1 denotes the first attempt to send the first right-channel-specific payload. Thus, as illustrated, source device 102 is configured to broadcast via BIS stream 120, eight sequential attempts (four for the left and four for the right channel audio) at sending the first payload, i.e., through packets L 1.1-L 1.4 and R 1.1-R 1.4. This would give the stereo pair of truly wireless headphones, e.g., devices 104B and 104C (not shown), four opportunities to receive the first payload for each headphone. To increase the robustness of this configuration, the charging case, shown as first device 104A can listen for the first left-channel-specific payload and the first right-channel-specific payload and act as an unconditional retransmitter for both payloads. As shown, during the first two subevents (where source device 102 transmits packets L 1.1 and R 1.1) case device 104A can listen for and receive the first and second stereo payloads associated with the left and right channel stereo signals. Then, unconditionally, during subsequent subevents, case 104A can provide (in an alternating pattern) duplicate copies of packets L 1.1 and R 1.1 in overlapping events, i.e., overlapping in time, with respect to the duplicate transmissions of source device 102. In some examples, the overlapping events of the case 104A can transmit the opposite payload than the source device 102 is transmitting during the same subevent. For example, as shown in FIG. 14, the first retransmission from case 104A overlaps in time with the first duplicate transmission from source device 102; however, the first duplicate transmission from source 102 is a left-channel-specific payload (i.e., packet L 1.2) while the first retransmission from case 104 is a right-channel-specific payload (i.e., packet R 1.1). This overlapping allows both earbuds to tune their respective radios 116 to listen for duplicate packets during overlapping time intervals. In some examples, this allows case 104A to retransmit even when source device 102 is not transmitting or experiences some transmission error. As shown, source device 102 may experience a failure to transmit duplicate packets L 1.4 and R 1.4 (shown by grey boxes in FIG. 14). In this example, since case 104A is sending retransmitted duplicate packets for the left and right channels in overlapping events, this example affords the left and right headphones an additional opportunity to receive a dropped packet from case 104A rather than source device 102. It should also be appreciated that in the example described above, where devices 104 include a truly wireless headphones and a case configured to matingly engage with and charge the headphones, the retransmission by case 104A can utilize a broadcast isochronous stream or a connected isochronous stream that had previously been established between each headphone and the case.

It should be appreciated that system 100, can utilize the foregoing unconditional retransmission schemes (illustrated and described with respect to FIGS. 4-8) and the foregoing condition retransmission schemes (illustrated and described with respect to at least FIGS. 9-11), to adaptively switch to the retransmission scheme that maximizes the system's efficiency. For example, system 100 can begin utilizing the condition retransmissions schemes discussed above. In the event that a significant number of devices 104 are dropping, missing, or otherwise failing to successfully receive packets, system 100 may adaptively revert, fallback, or switch from a conditional retransmission scheme to the unconditional retransmission schemes discussed herein, such that any device that successfully receives a given packet or given payload unconditionally retransmits that payload to any device that still needs it.

Figure 15:
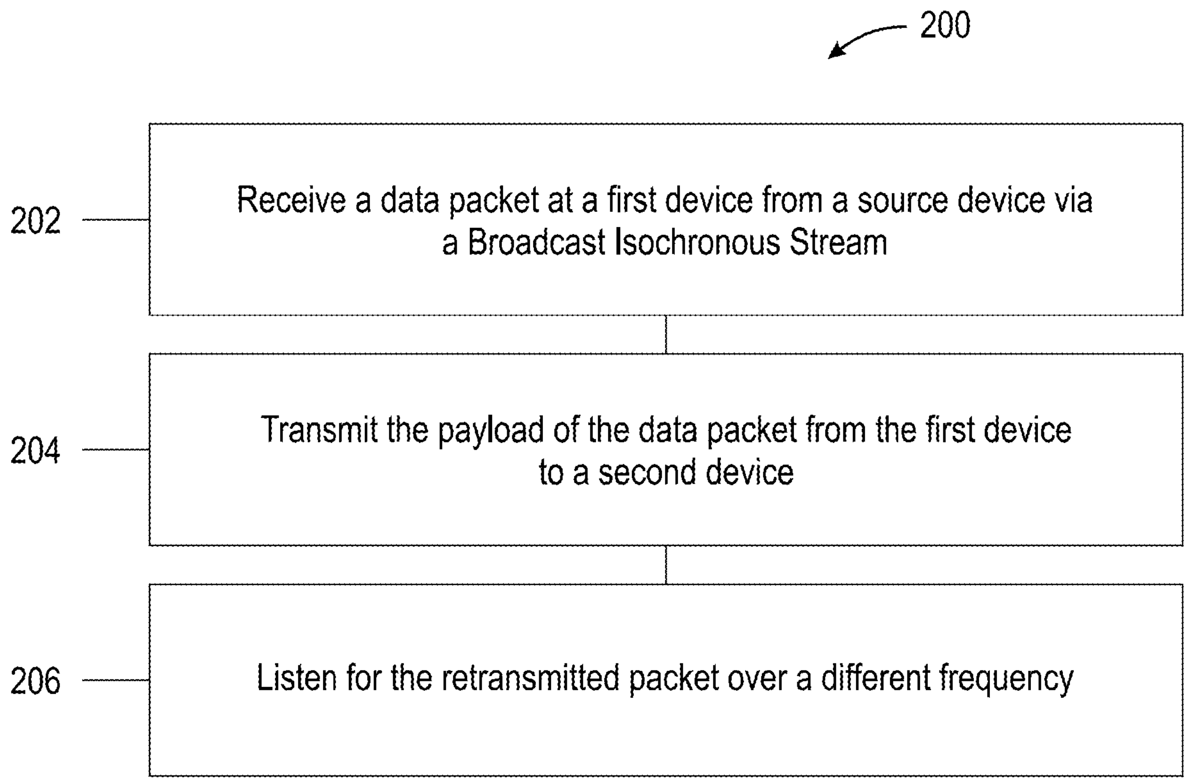
FIG. 15 is a flow chart illustrating the steps of a method according to the present disclosure.

FIG. 15 illustrates a flow chart corresponding to method 200 according to the present disclosure. As shown, method 200 is read from the perspective of device 104A. As such, method 200 can include, for example: receiving, at a first device 104A, the payload 136 of a first data packet 128 sent from a source device 102 via a broadcast isochronous stream 120 (Step 202); transmitting the payload 136 from the first device 104A to a second device (104B,104C), via a data stream (148A) (Step 204); and listening for a retransmitted data packet (e.g., packet 1.1.1) over a second transmission frequency F2 different than the first transmission frequency F1 related to the payload 136 received by the first device 104A. In some implementations, the clock used for sending retransmission from the first device 104A is synchronized to the clock of the source device 102 to ensure that the retransmissions do not drift into the stream from the source device 102 (such as the stream from the source device 102 to a second device (e.g., 104B)).

Figure 16:
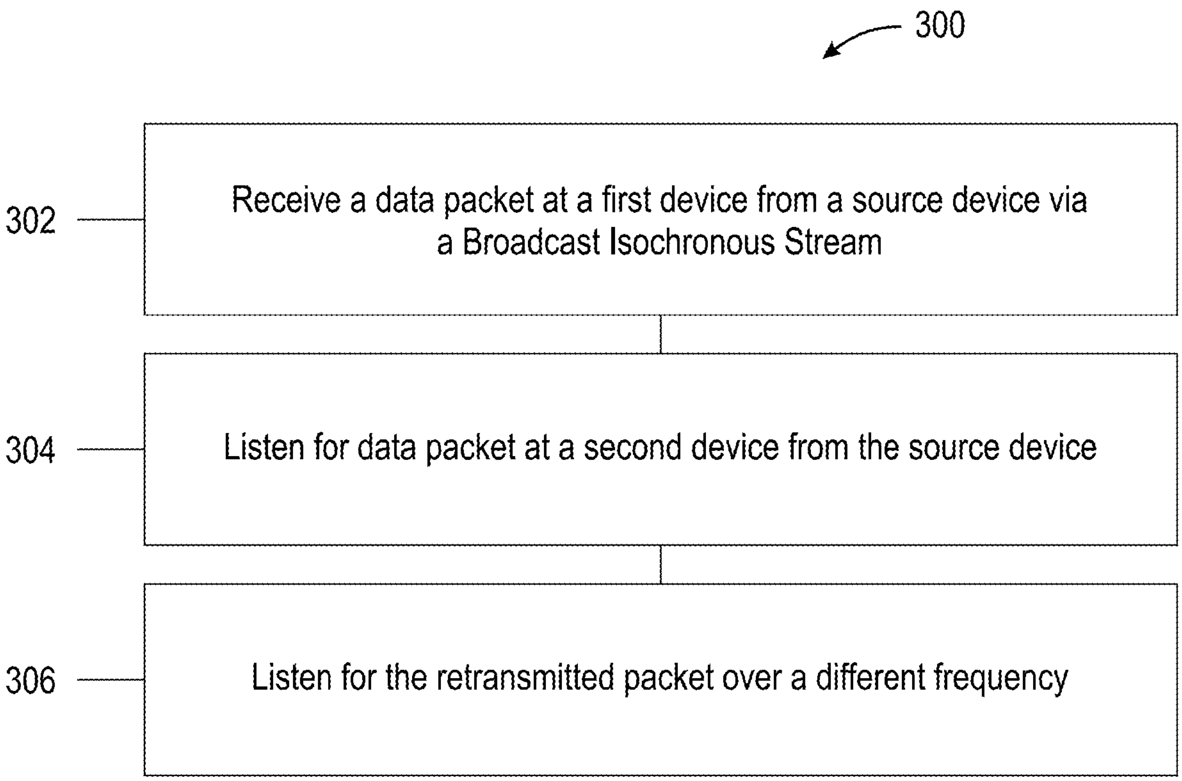
FIG. 16 is a flow chart illustrating the steps of a method according to the present disclosure.

FIG. 16 illustrates a flow chart corresponding to method 300 according to the present disclosure. As shown, Method is read from the perspective of device 104C. As such, method 300 can include, for example: receiving at a first device 104A a first data packet 128 of a broadcast isochronous stream 120 from a source device 102, the first data packet 128 having a payload 136 (Step 302); listening for, at a second device 104C, the first data packet 128 of the broadcast isochronous stream 120 from the source device 102 (Step 304); and listening for, at the second device 104C, a retransmitted data packet (e.g., packet 1.1.1) from the first device 104A sent via a data stream 148A, after not receiving the first data packet 128 from the source device 102, the retransmitted data packet having the payload (Step 306). In some examples, listening for the retransmitted data packet includes listening over a second transmission frequency F2 different than the first transmission frequency F1 related to the payload 136 received by the first device 104A.

As can be understood based on this disclosure, the techniques described herein can be used to extend the transmission range of broadcast isochronous streams used by, e.g., LE Audio (Bluetooth 5.2 and higher). For instance, in some implementations, a first device (e.g., first device 104A) within the transmission range of a source device (e.g., source device 102) transmitting the broadcast isochronous stream is configured to receive the broadcast isochronous stream and retransmit it to a second device (e.g., second device 104B) that is outside the transmission range of the source device. In some such implementations, the first and second devices may be audio devices configured to output audio via one or more speakers based on the broadcast isochronous stream. In such implementation, audio playback at the first device may be controlled and/or delayed to ensure audio synchronization at, where such controlling and/or delaying of playback of the audio data could be included in the original broadcast isochronous stream (e.g., such that the source device is controlling/delaying the playback) or it could be later appended to the stream data (e.g., provided by the first device when retransmitting the stream, such that the first device is controlling/delaying the playback). However, in other implementations, the first and/or second device need not include capabilities of outputting audio from the broadcast isochronous stream, as they may merely be devices that retransmit the stream and/or use the data in some other manner (e.g., interpreting the broadcast isochronous stream to provide visual outputs of the stream, such as to provide audio data to text data transcription of speech in the stream). Further, once the second device receives the retransmitted broadcast isochronous stream from the first audio device, it could again retransmit the broadcast isochronous stream, and so forth. Thus, the techniques variously described herein can be used to establish an LE Audio broadcast mesh network, whether or not devices receiving retransmitted data packets are within the transmission range of the original source device. In other words, the techniques described herein can be applied whether the device receiving retransmitted data packets (e.g., the second device of FIGS. 15 and 16) is within the transmission range of the source device (i.e., the device providing the original broadcast isochronous stream) or whether the device receiving retransmitted data packets is outside the transmission range of the source device.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method comprising:

receiving, at a first device and a second device, data from a source device via a first broadcast isochronous stream;

using the data at the first device and the second device for audio playback; and transmitting, via a second broadcast isochronous stream, at least a portion of the data from the first device to a third device during a first time;

transmitting, via a third broadcast isochronous stream, at least of portion of the data from the second device to the third device during a second time, wherein the second time is shifted with respect to the first time by a time offset.

2. The method of claim 1, wherein the transmitting of the at least a portion of the data from the first device to the third device uses a different frequency or channel relative to a frequency or channel used for receiving the data from the source device.

3. The method of claim 1, wherein the data is received at the first device within a first subevent of a Broadcast Isochronous Stream (BIS) interval of the first broadcast isochronous stream and the transmission of the at least a portion of the data from the first device to the third device is performed during a time interval coincident with, overlapping with, or after a second subevent of the BIS interval of the broadcast isochronous stream, where the second subevent is after the first subevent.

4. The method of claim 3, wherein the data is received at the first device within a first subevent of a Broadcast Isochronous Stream (BIS) interval of the first broadcast isochronous stream and the transmission of the at least a portion of the data from the first device to the third device is performed during a time interval that has been temporally shifted with respect to a subevent of the BIS interval of the broadcast isochronous stream, where the second subevent is after the first subevent.

5. The method of claim 1, wherein the third device is configured to acknowledge receipt of the data such that the transmission of the at least a portion of the data from the first device to the second device occurs only when the third device has not acknowledged receipt of the data.

6. The method of claim 1, wherein the data is received at the first device within a first Broadcast Isochronous Stream (BIS) interval of the first broadcast isochronous stream and the transmission of the at least a portion of the data from the first device to the third device occurs during a second BIS interval of the broadcast isochronous stream after the first BIS interval.

7. The method of claim 1, wherein the data includes audio data relating to a left channel or a right channel of a stereo audio signal.

8. The method of claim 1, wherein the data includes audio data relating to multiple channels of a multichannel audio signal.

9. The method of claim 1, further comprising, prior to the transmission of the at least a portion of the data from the first device to the third device, receiving, at the first device, an indication that the third device requests the transmission.

10. A system comprising a first device and a second device, the first device comprising:

at least one speaker;

at least one communication module; and at least one processor configured to using the at least one communication module, receive data from a source device via a first broadcast isochronous stream, using the at least one speaker, play back audio using the data, and using the at least one communication module, transmit, via a second broadcast isochronous stream at least a portion of the data to a third device during a first time, wherein the second device is configured to:

receive the data from a source device via the first broadcast isochronous stream; and transmit, via a third broadcast isochronous stream, at least of portion of the data from the second device to the third device during a second time, wherein the second time is shifted with respect to the first time by a time offset.

11. The system of claim 10, wherein the transmitting of the at least a portion of the data from the first device to the third device uses a different frequency or channel relative to a frequency or channel used for the first device receiving the data from the source device.

12. The system of claim 10, wherein the data is received within a first subevent of a Broadcast Isochronous Stream (BIS) interval of the first broadcast isochronous stream and the transmission of the at least a portion of the data from the first device to the third device is performed during a time interval coincident with, overlapping with, or after a second subevent of the BIS interval of the broadcast isochronous stream, where the second subevent is after the first subevent.

13. The system of claim 10, wherein the data is received within a first subevent of a Broadcast Isochronous Stream (BIS) interval of the first broadcast isochronous stream and the transmission of the at least a portion of the data to from the first device to the third device is performed during a time interval that has been temporally shifted with respect to a second subevent of the BIS interval of the first broadcast isochronous stream, where the second subevent is after the first subevent.

14. The system of claim 10, wherein the third device is configured to acknowledge receipt of the data such that the transmission of the at least a portion of the data to the other device occurs only when the third device has not acknowledged receipt of the data.

15. The system of claim 10, wherein the data is received within a first Broadcast Isochronous Stream (BIS) interval of the first broadcast isochronous stream and the transmission of the at least a portion of the data to the third device occurs during a second BIS interval of the broadcast isochronous stream after the first BIS interval.

16. The system of claim 10, wherein the data includes audio data relating to a left channel or a right channel of a stereo audio signal.

17. The system of claim 10, wherein the data includes audio data relating to multiple channels of a multichannel audio signal.

18. The system of claim 10, further comprising, prior to the transmission of the at least a portion of the data to the other device, receiving an indication that the other device requests the transmission.

* * * * *